(12) United States Patent
Lazier et al.

(10) Patent No.: US 10,608,813 B1
(45) Date of Patent: *Mar. 31, 2020

(54) LAYERED ENCRYPTION FOR LONG-LIVED DATA

(71) Applicant: Amazon Technologies, Inc., Seattle, WA (US)

(72) Inventors: Colin Laird Lazier, Seattle, WA (US); Bryan James Donlan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/401,983

(22) Filed: Jan. 9, 2017

(51) Int. Cl.
*H04L 29/06* (2006.01)
*H04L 9/06* (2006.01)
*G06F 21/60* (2013.01)
*H04L 9/08* (2006.01)
*H04L 9/32* (2006.01)

(52) U.S. Cl.
CPC .......... *H04L 9/0618* (2013.01); *G06F 21/602* (2013.01); *H04L 9/0656* (2013.01); *H04L 9/0869* (2013.01); *H04L 9/3278* (2013.01)

(58) Field of Classification Search
CPC .... H04L 9/0618; H04L 9/0656; G06F 21/602
See application file for complete search history.

(56) References Cited

U.S. PATENT DOCUMENTS

| | | | |
|---|---|---|---|
| 5,438,622 A | 8/1995 | Normile et al. | |
| 6,324,287 B1 * | 11/2001 | Angert | H04L 9/0662 380/262 |
| 8,401,186 B2 | 3/2013 | Liu | |
| 8,687,810 B2 | 4/2014 | Bukshpun et al. | |
| 9,342,705 B1 | 5/2016 | Schneider et al. | |
| 2004/0120521 A1 | 6/2004 | Henson et al. | |
| 2006/0041533 A1 | 2/2006 | Koyfman | |
| 2006/0177065 A1 * | 8/2006 | Halbert | H04L 9/0662 380/277 |
| 2008/0133935 A1 | 6/2008 | Elovici et al. | |
| 2010/0211787 A1 | 8/2010 | Bukshpun et al. | |
| 2013/0067213 A1 | 3/2013 | Liu | |
| 2014/0189359 A1 | 7/2014 | Marien et al. | |
| 2014/0201538 A1 | 7/2014 | O'Hare et al. | |

(Continued)

FOREIGN PATENT DOCUMENTS

WO 0058865 A1 10/2000

OTHER PUBLICATIONS

Raghavendra et al., "DRSIG: Domain and Range Specific Index Generation for Encrypted Cloud Data," 2016 International Conference on Computational Techniques in Information and Communication Technologies (ICCTICT), 6 pages.

*Primary Examiner* — Dao Q Ho
(74) *Attorney, Agent, or Firm* — Davis Wright Tremaine LLP

(57) ABSTRACT

Techniques for encrypting long-term data using layered encryption based on difficult to obtain secrets are described herein. The set of data to encrypt is designated as the source data for the first iteration. Then, for each iteration, a derived set of data is generated from a set of random data and the source data is combined with the derived set of data to produce a set of encrypted data. The set of encrypted data is then designated as the source data for the next iteration.

18 Claims, 23 Drawing Sheets

(56) References Cited

U.S. PATENT DOCUMENTS

| | | |
|---|---|---|
| 2014/0325215 A1 | 10/2014 | Wright |
| 2016/0299924 A1 | 10/2016 | Fujimoto et al. |
| 2016/0315763 A1 | 10/2016 | Hammon et al. |
| 2017/0054550 A1 | 2/2017 | Choi et al. |
| 2017/0061151 A1 | 3/2017 | Baessler et al. |
| 2017/0103217 A1 | 4/2017 | Arasu et al. |
| 2017/0288858 A1 | 10/2017 | Hirano et al. |
| 2018/0013735 A1 | 1/2018 | Guo et al. |

\* cited by examiner

LAYERED ENCRYPTION FOR LONG-LIVED DATA

CROSS-REFERENCE TO RELATED APPLICATIONS

This application incorporates by reference for all purposes the full disclosures of co-pending U.S. patent application Ser. No. 15/401,994, filed Jan. 9, 2017, entitled "LAYERED ENCRYPTION OF SHORT-LIVED DATA" and co-pending U.S. patent application Ser. No. 15/402,000, filed Jan. 9, 2017, entitled "ENCRYPTION USING INDEXED DATA FROM LARGE DATA PADS."

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource service providers who leverage large-scale networks of computers, servers, and storage drives to enable customers to host and execute a variety of applications and services. The usage of such network computing and network data storage allows customers to efficiently and adaptively satisfy their varying computing needs, whereby the computing and data storage resources that may be required by the customers are added or removed from a large pool provided by a computing resource service provider as needed.

The proliferation of network computing and network data storage, as well as the attendant increase in the number of entities dependent on network computing and network data storage, have increased the amount of data to be stored. Because consumers have a variety of usages for stored data, different data objects are stored for varying amounts of time. Securely storing data for varying amounts of time can cause significant demand for resources needed to protect the data while it is stored and to retrieve the data when the data is accessed.

BRIEF DESCRIPTION OF THE DRAWINGS

Various techniques will be described with reference to the drawings, in which.

DETAILED DESCRIPTION

Figure 1:
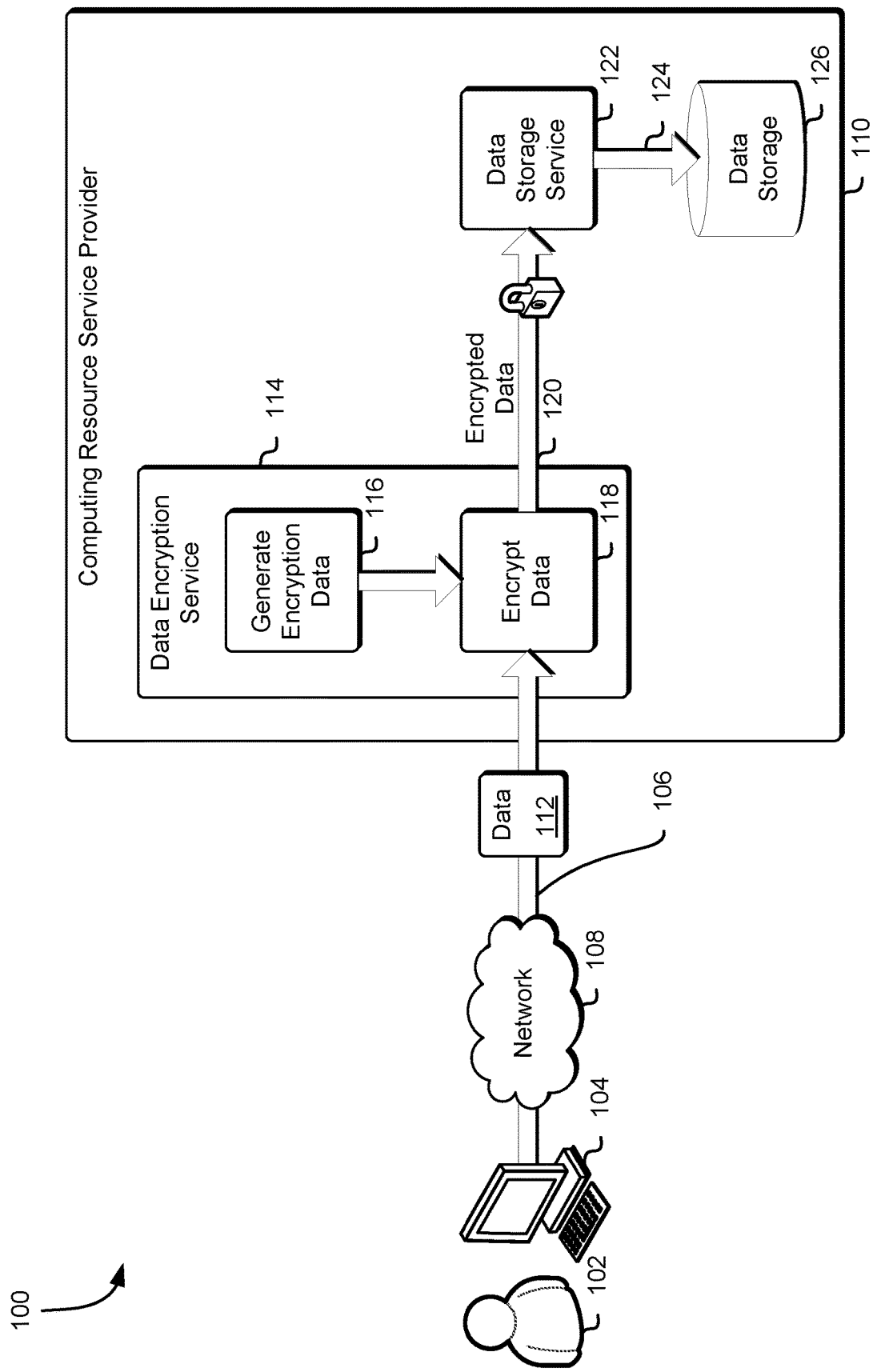
FIG. 1 illustrates an example environment where data is encrypted and stored using a data encryption service.

When a customer of a computing resource service provider generates data for storage within the computing resource service provider environment, that data is typically encrypted before being stored. One way of ensuring that the encryption is secure is to make the encryption method mathematically secure. That is, for the foreseeable life of the data, it would be prohibitively computationally expensive to (without appropriate secret information such as a cryptographic key) mathematically invert the encryption and derive the original data from the stored encrypted data. For example, a block cipher, which encrypts data in blocks using a cryptographic key, can take considerable computational resources to mathematically reverse without the cryptographic key. If it takes longer to crack the encryption than the data is stored, the encryption is essentially secure.

However, in cases where the data may be stored for decades or even centuries, it is difficult to determine how secure the cryptographic algorithm and/or the cryptographic keys should be, mathematically, to ensure that the long-term data remains secure throughout the storage lifetime. For example, a set of data that will be stored for a century may be encrypted using a cryptographic algorithm and/or cryptographic keys that would take thousands of years to crack using today's computing resources but would only take a few hours to crack using computing resources seventy-five years from now.

One solution to ensuring cryptographic security over longer periods of time is to use encryption methods that do not rely on mathematical complexity, but instead rely on a difficulty associated with obtaining the secret used to perform the encryption. For example, a one-time pad of random (e.g., pseudorandom) values can be used to encrypt a plaintext message. Because the values in the pad are random, the encrypted message is immune to mathematical decryption and can only be decrypted with the one-time pad. For example, when encrypted using a one-time pad, it is equally likely that the encrypted text "sjeiosjsk" decrypts to "plaintext" as it is that that encrypted text decrypts to "topsecret" or any other such result. Each letter or block is encrypted with a different random value in a one-time pad and so using techniques such as frequency counts of the encrypted message are fruitless. Without the one-time pad, the encrypted text remains secure. However, reusing a one-time pad can defeat the security since patterns may be detectable if multiple messages are encrypted using the same one-time pad. As used herein, "random" values and "random" numbers are values and numbers generated using random (e.g., pseudorandom) number generators.

This disclosure describes techniques for using modifications of one-time pads and combining them with layered encryption methods to encrypt data. Layered encryption is an iterative encryption process whereby multiple iterations of an encryption process are performed, with each iteration taking, as source data, the result of the previous iteration. That is data "A" may be source data for the first iteration of an iterative encryption process (e.g., layered encryption) and the first iteration may produce encrypted data "B." In an iterative encryption process, encrypted data "B" may be the source data for a subsequent iteration (also referred to herein as a "later iteration") of the iterative encryption process. The layered encryption may continue for a number of iterations that may be based at least in part on a property of the data to be encrypted.

By using techniques that rely on a difficulty in obtaining the secret used to perform the encryption and combining them with mathematical encryption techniques, data can be stored in long-term (e.g., persistent) storage securely. By using other techniques that rely on a difficulty in obtaining multiple secrets and combining those with mathematical encryption techniques, data can also be stored in short-term storage in a highly secure manner.

In a first example, a set of random data is generated. This is the base data pad. It is like a one-time pad but, as it is used multiple times, it is not referred to as a one-time pad in this disclosure. The base data pad may be generated by a random (e.g., a pseudorandom) number generator. Next, a derived data pad is generated from the base data pad using one or more encryption techniques, and the derived data pad is used to encrypt the data. The seeds or keys used to generate the derived data pad from the base data pad are stored but, using the techniques described, decryption of the encrypted data involves obtaining the seeds or keys and obtaining the base data pad.

As described above, the base data pad can be used multiple times, provided that a different derived data pad is used for each encryption. Using the same derived data pad multiple times reduces the security in the same manner that re-using a one-time pad multiple times reduces security. After a number of uses, the base data pad is exhausted and is then encrypted and stored in persistent storage. A new base data pad is then generated and used to generate the derived data pads. Periodically, the base data pads that are stored in persistent storage can be retrieved from persistent storage, decrypted, and then re-encrypted using a current state of the art encryption method of the day. For example, a base data pad that is encrypted today and stored using today's state of the art encryption method may, in a decade, be retrieved from storage, decrypted, and then re-encrypted using the state of the art in encryption of a decade from now.

As described above, the techniques described in this disclosure increase the difficulty in cracking the encrypted data beyond just mathematical difficulty. For example, a base data pad of one terabyte (TB) be used one thousand times to generate one thousand derived data pads and, thus, encrypt one petabyte (PB) of data. Decrypting that one PB of data involves obtaining the base data pad, the key used to encrypt the base data pad, and the one thousand keys used to generate the derived data pads. An attacker could not decrypt the one PB of data without the encrypted base data pad and all of the keys. By storing the encrypted data, the base data pad, and the keys in different locations, it becomes considerably more difficult for an attacker to obtain all of the elements necessary to crack the encryption, and by periodically re-encrypting the base data pad with state-of-the-art cryptography, the security may be maintained long-term.

To increase the complexity of the encryption, multiple base data pads or multiple derived data pads can be used with layered encryption. In layered encryption, the result of a first encryption is used as the source data for a second encryption. This is repeated several times. If each encryption uses a different base data pad and/or a different derived data pad, complexity of obtaining all of the elements necessary to crack the encryption is increased.

When using layered encryption, the seeds and keys used to generate the derived data pads can also be derived from the data rather than being stored. In order to decrypt the first layer of the encryption, the base data pad for that layer and the keys used to generate the derived data pad are needed. Decrypting the second layer of the encryption involves obtaining another base data pad, and it can only be determined which base data pad is needed after the first layer is decrypted. Thus, an unauthorized decryption involves returning to the secure data storage multiple times for multiple base data pads in order to fully decrypt the layered encryption.

For short-term data, which may also be much smaller, the techniques described here can also be used. For example, a credit card or a secure socket layer (SSL) session token can be encrypted using such layered encryption. First, a very large data pad is generated. The very large data pad is a random data pad that is one PB or more and is generated so that each block (e.g., each 64 bits) is unique. A random index is generated that selects a block within the large data pad. The block is used as a small base data pad as described above, namely that the small base data pad is encrypted to produce a small derived data pad, and that small derived data pad is used to encrypt the short-term data. The encrypted data is then used to generate an encryption key, and that key is used to encrypt the random index, which is stored.

Performing this encryption multiple times, where the output of one encryption is used as the source for the next iteration (e.g., a later iteration), produces secure data that cannot be easily decrypted without the large data pad. As the indexes are essentially random walks through the large data pad, the entire large data pad is needed to decrypt the data and, as the encrypted data for each iteration is used to generate the key used to encrypt the indexes, each layer of decryption must be completed before the data used in the decryption of the next layer can be determined. Again, such decryption requires accessing the large data pad multiple times. An attacker that accesses such a large amount of data multiple times would be readily detectable.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where data is encrypted and stored using a data encryption service in accordance with an embodiment. In the example environment 100 illustrated in FIG. 1, a user 102 may use a client computing device 104 to connect 106 to a variety of services provided by a computing resource service provider 110. The user 102 may use the client computing device 104 to connect 106 to the computing resource service provider 110 over a network 108 such as those networks described herein. The computing resource service provider 110 may provide a distributed, virtualized, and/or datacenter environment within which one or more applications, processes, services, virtual machines, and/or other such computer system entities may be executed. The user 102 may be a person, or may be a process running on one or more remote computer systems, or may be some other computer system entity, user, or process.

Commands from the user 102 to the computing resource service provider 110 may originate from an outside computer system or from within the computing resource service provider environment. The commands to connect 106 to the computing resource service provider 110 may be sent to the computing resource service provider 110 and/or the services operating in the environment therein, without the direct intervention of the user 102 (i.e., commands to connect 106 to the computing resource service provider 110 may be generated automatically in response to one or more events). The user 102 may be a privileged user associated with a customer of the computing resource service provider 110. The user 102 may also be a privileged user associated with the computing resource service provider 110.

The computing resource service provider 110 may provide access to one or more host machines, may provide access to one or more virtual machine instances as may be operating thereon, or may provide access to one or more services in an environment therein. The one or more services provided by the computing resource service provider 110 may also be implemented as and/or may utilize one or more virtual machine instances as may be operating on host machines operating within the computing resource service provider 110 environment. For example, the computing resource service provider 110 may provide a variety of services to users including, but not limited to, the user 102. The users such as the user 102 may communicate with the computing resource service provider 110 via an interface such as a web services interface or any other type of interface. While the example environment illustrated in FIG. 1 shows a single connection or interface to the computing resource service provider 110, each of the services operating in an environment therein may have its own interface and, generally, subsets of the services may have corresponding interfaces in addition to or as an alternative to the single interface.

In an example of a type of service operating within the environment of the computing resource service provider 110, a virtual computer system service may be a collection of computing resources configured to instantiate virtual machine instances on behalf of a customer such as the user 102. The user 102 is the customer associated with a request to encrypt and store data as described below. The user 102 that generates the request to encrypt and store data may be the customer of the computing resource service provider 110 that is associated with the data set that is associated with the request. The user 102 that generates the request to encrypt and store data may be the customer associated with the encryption and storage request where the request is to store data on behalf of another user, service, or computer system entity. The user 102 may become associated with the backup data set and/or the backup data request as a result of owning the data set that will be encrypted and stored. The user 102 may also become associated with the backup data set and/or the backup data request as a result of requesting the encryption and storage of the data (i.e., as a result of generating the encryption and storage request).

The customer may interact with a virtual computer system service (via appropriately configured and authenticated API requests) to provision and operate virtual machine instances that are instantiated on physical computing devices hosted and operated by the computing resource service provider 110. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

As described above, a user 102 may generate a request to encrypt and store data 112. A data encryption service 114 may receive the request to encrypt and store the data 112. The data encryption service 114 may then generate encryption data 116 as described herein. The data encryption service 114 may then encrypt the data 118 using the techniques described herein. For example, when the data encryption service 114 receives a request to encrypt and store data 112, the encryption service can generate a plurality of derived data pads and use those derived data pads to encrypt the data 112 using layered encryption techniques such as those described herein.

The data encryption service 114 may be a collection of computing resources that operate collectively to process requests to encrypt data. The computing resources configured to process requests to encrypt data include at least one of: computer systems (the computer systems including processors and memory), networks, storage devices, executable code, services, processes, modules, or applications. The computing resources configured to process requests to encrypt data may also include virtual systems that are implemented on shared hardware hosted by, for example, a computing resource service provider such as the computing resource service provider 110. The data encryption service 114 may be implemented as a single system or may be implemented as a distributed system, with a plurality of instances operating collectively to process requests to encrypt data. The data encryption service 114 may operate using computing resources (e.g., databases and/or virtual machine instances) that enable the data encryption service 114 to store, locate, and retrieve encryption data quickly, to allow encryption operations to be performed in response to requests to encrypt data, to allow encrypted data to be retrieved from storage, or to allow decryption operations to be performed in response to requests to retrieve encrypted data (e.g., restore requests).

The data encryption service 114 may also maintain data and/or metadata associated with the encrypted data in a manner such that, when a request to retrieve a set of encrypted data is received, the encrypted data can be located, decrypted, and provided (or streaming data object can be initiated) in a response to the request. As noted, data encrypted by the data encryption service 114 may be organized into data objects which may be stored as described below. The data objects may have arbitrary sizes except, in some embodiments, may have constraints on size or durability. Thus, the data encryption service 114 may manage the encryption of numerous data objects of varying sizes. The data encryption service 114 may cause the data objects to be stored in storage resources controlled by the data encryption service 114, may cause the data objects to be stored using resources controlled by some other service such as a data storage service 122 (as described below), or may cause the data objects to be stored using a combination of these storage locations. The data encryption service 114 may also operate as a key value store that associates the data objects with identifiers of the data objects that may be used to retrieve or perform other operations in connection with the data objects encrypted by the data encryption service 114. The data encryption service 114 may also generate metadata associated with the data objects and may cause such metadata to be stored with the data objects.

When the data encryption service 114 has performed the operations to encrypt the data 118, the encrypted data 120 may then be provided to a data storage service 122 which may store 124 the encrypted data in data storage 126. In an embodiment, the data storage 126 is long-term storage such as the long-term storage described herein.

As with the data encryption service 114, the data storage service 122 may be a collection of computing resources that operate collectively to process requests to store and/or access data such as, for example, encrypted data 120 generated by the data encryption service 114. The computing resources configured to process requests to store and/or access data include at least one of: computer systems (the computer systems including processors and memory), networks, storage devices, executable code, services, processes, modules, or applications. The computing resources configured to process requests to store and/or access data may also include virtual systems that are implemented on shared hardware hosted by, for example, a computing resource service provider such as the computing resource service provider 110. The data storage service 122 may be implemented as a single system or may be implemented as a distributed system, with a plurality of instances operating collectively to process requests to store and/or access data. The data storage service 122 may operate using computing resources (e.g., databases) that enable the data storage service 122 to locate and retrieve data quickly, to allow data to be provided in responses to requests for the data.

For example, the data storage service 122 may maintain stored data in a manner such that, when a request to retrieve a set of data is received, the data can be located and provided (or a streaming data object can be initiated) in a response to the request. As noted, data stored in the data storage service 122 may be organized into data objects. The data objects may have arbitrary sizes except, in some embodiments, may have constraints on size or durability. Thus, the data storage service 122 may store numerous data objects of varying sizes. The data storage service 122 may store the data objects in storage resources controlled by the data storage service 122, may cause the data objects to be stored using resources controlled by some other service, or may use a combination of these storage locations. The data storage service 122 may also cause the data objects to be redundantly stored using some redundancy encoding technique, may further cryptographically encode the data objects, or may use a combination of these and/or some other data preprocessing techniques. The data storage service 122 may also operate as a key value store that associates data objects with identifiers of the data objects that may be used by a user to retrieve or perform other operations in connection with the data objects stored by the data storage service 122. The data storage service 122 may also generate additional metadata associated with the data objects that may be stored with the data objects.

It should be noted that, while the example illustrated in FIG. 1 shows the data 112 being received from outside the environment of the computing resource service provider 110, the data 112 may also be generated by a service operating within the environment of the computing resource service provider 110. For example, a service within the environment of the computing resource service provider 110 can generate data that is to be encrypted and stored using the techniques described herein. Such data can be provided to the data encryption service 114 and stored using the data storage service 122 as described herein.

Figure 2:
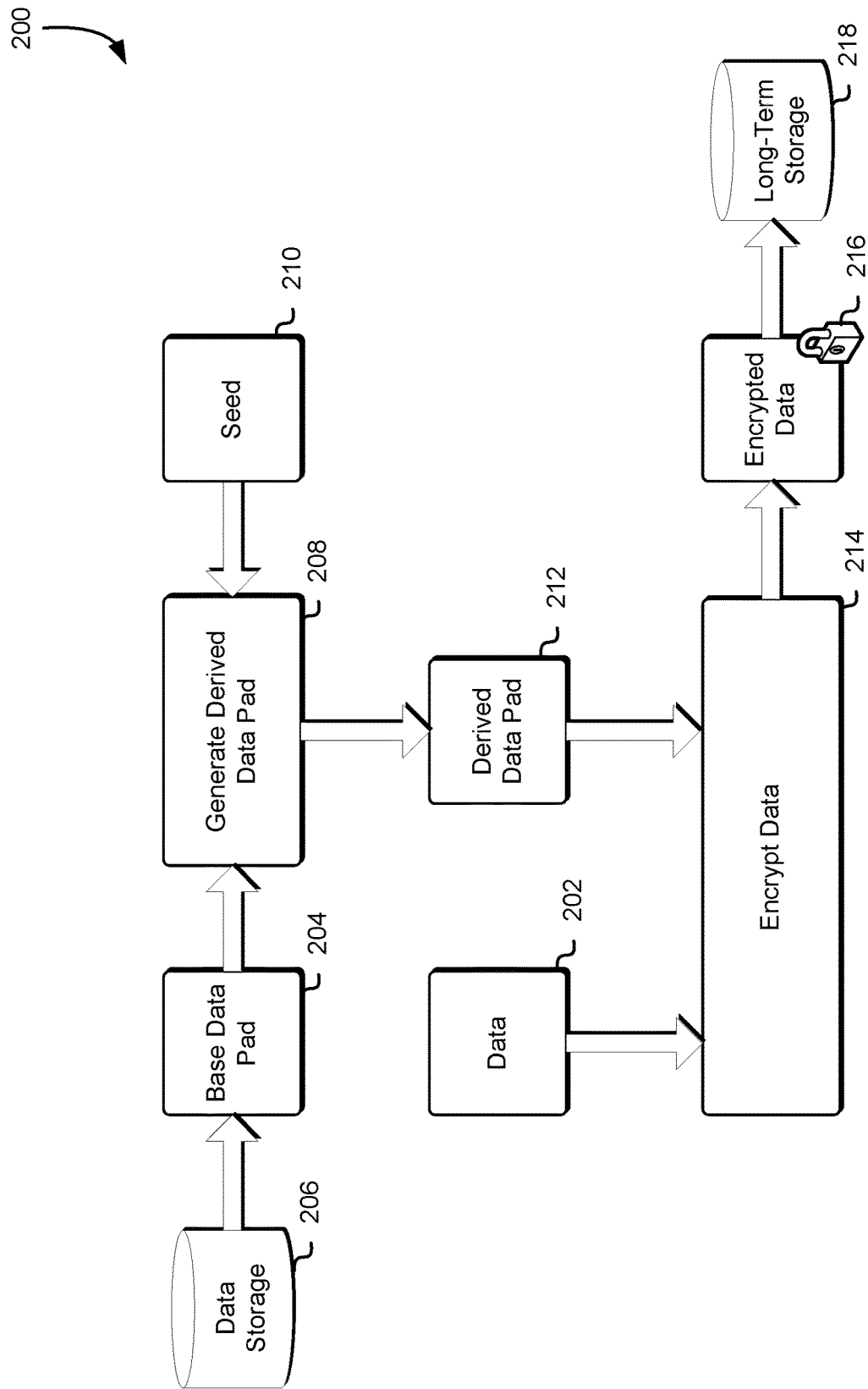
FIG. 2 illustrates an example environment where data is encrypted and stored in long-term storage using a data encryption service.

FIG. 2 illustrates an example environment 200 where data is encrypted and stored in long-term storage using a data encryption service as described in FIG. 1 and in accordance with an embodiment. In the example illustrated in FIG. 2, data 202 is encrypted by the data encryption service. First, a base data pad 204 is retrieved from data storage 206 using a data storage service such as the data storage service 122 described in connection with FIG. 1. In an embodiment, the base data pad 204 is generated by a data encryption service such as the data encryption service 114 described in connection with FIG. 1. In another embodiment, the base data pad 204 is generated by another service in response to a request from a data encryption service. In another embodiment, the base data pad 204 is generated as needed (e.g., "on demand") and stored in data storage 206 for multiple uses.

The base data pad 204 may be a set of random data that is generated by a random number generator or a set of pseudo-random data that is generated by a pseudo-random number generator. The base data pad 204 may be of a sufficient size to encrypt a single block of data, where the size of a single block of data may be determined based at least in part on a block size of a storage medium used to store encrypted data. For example, if a storage medium has a 1 TB block size, the base data pad 204 may also be 1 TB.

The base data pad 204 may then be used as the basis to generate 208 a derived data pad 212. The derived data pad 212 may be generated using a seed 210, which may be cryptographically combined with the base data pad to generate 208 the derived data pad 212. The seed 210 may be a random number or a cryptographic key that is used to permute the base data pad 204. The seed 210 may be unique for each encryption operation performed for each base data pad 204. That is, for each encryption operation that is performed using the base data pad 204, a new seed 210 is generated. In an embodiment where the seed 210 is randomly generated, the seed 210 may be stored in data storage as described below. In another embodiment the seed 210 is generated from an identifier associated with the data 202 and that identifier is hashed (i.e., permuted using a hashing algorithm with a low likelihood of collision) and that hashed identifier is used as the seed 210. In such an embodiment, the seed 210 may not be stored and, instead, the identifier associated with the data 202 may be stored with, for example, metadata associated with the data 202.

The derived data pad 212 is then used to encrypt 214 the data 202 by, for example, performing an invertible bitwise operation such as, for example, an "exclusive or" (denoted as "XOR" or "s" herein) operation on the data. In an illustrative example, a sixteen-bit set of data may be "0010 1011 0110 1011" and the derived data pad (also a sixteen-bit set of data) may be "0100 1101 0100 1011." The XOR of the data and the derived data pad is "0110 0110 0010 0000." This encrypted data 216 (e.g., the value obtained from XORing the data 202 and the derived data pad 212) is the result of the operation to encrypt 214 the data 202 using the derived data pad 212.

The XOR operation is also used to decrypt the encrypted data. If the data 202 is designated as "A," the derived data pad 212 is designated as "B," and the encrypted data (e.g., the result of the operation to encrypt 214 the data 202) is designated as "C," then $A \oplus B = C$. However, based on the properties of XOR, $A \oplus C = B$ and $B \oplus C = A$. Thus, the data 202 (e.g., "A") may be decrypted from the encrypted data 216 (e.g., "C") using the derived data pad 212 (e.g., "B") by XORing the encrypted data 216 with the derived data pad 212.

The encrypted data 216 may then be stored in long-term storage such as, for example, write-once long-term media using the data storage service as described above. Although not illustrated in FIG. 2, the base data pad 204 may be used for a limited number of times before such use is exhausted. For example, if the base data pad 204 is 1 TB in size, it may be used one-thousand twenty-four times to generate a derived data pad 212 and thus may be used to encrypt 1 PB of data. The number of times that a base data pad 204 may be used for encryption operations may be based at least in part on a calculation of a likelihood of mathematically determining the contents of the base data pad 204 from the resulting encrypted data. Each reuse of a one-time pad may increase the likelihood that the one-time pad may be mathematically determined based on, for example, word or letter frequency counts and/or commonality of encrypted segments. The likelihood that the base data pad 204 may be mathematically determined may be similarly calculated and that calculation may be used to determine the limited number of times that the base data pad 204 may be used before such use is exhausted. It should be noted that, when the base data pad 204 is permuted using a different seed 210 for each encryption operation, the likelihood of mathematically determining the contents of the base data pad 204 from the resulting encrypted data is decreased.

In an embodiment, the limited number of times that a base data pad 204 may be used is determined based at least in part on a determination of a cost of use associated with the base data pad 204. Such a determination (referred to herein as a "blast radius" of the base data pad 204) is based on several factors. For example, the more times that the base data pad 204 is used, the more copies of the base data pad 204 may be required to perform decryption operations of the data encrypted using the base data pad 204. Additionally, more computing system resources may be required to perform decryption operations of the data encrypted using the base data pad 204. A secondary impact of the number of uses of the base data pad 204 (i.e., the blast radius) is, more copies of the base data pad 204 that are present in a computer system may provide more opportunities to obtain the base data pad 204. Additionally, more copies of the base data pad 204 that are present in a computer system may make it more difficult to erase the base data pad 204 from temporary storage (i.e., the storage used when performing encryption and/or decryption operations). Other factors that may increase the blast radius of a base data pad 204 include, but are not limited to, the durability of the base data pad (i.e., the number of copies used to redundantly store the base data pad), the load of the base data pad (i.e., the computation resources used to maintain the base data pad), and the cost of media of the base data pad (i.e., the cost of the media that is used to store the base data pad).

Figure 3:
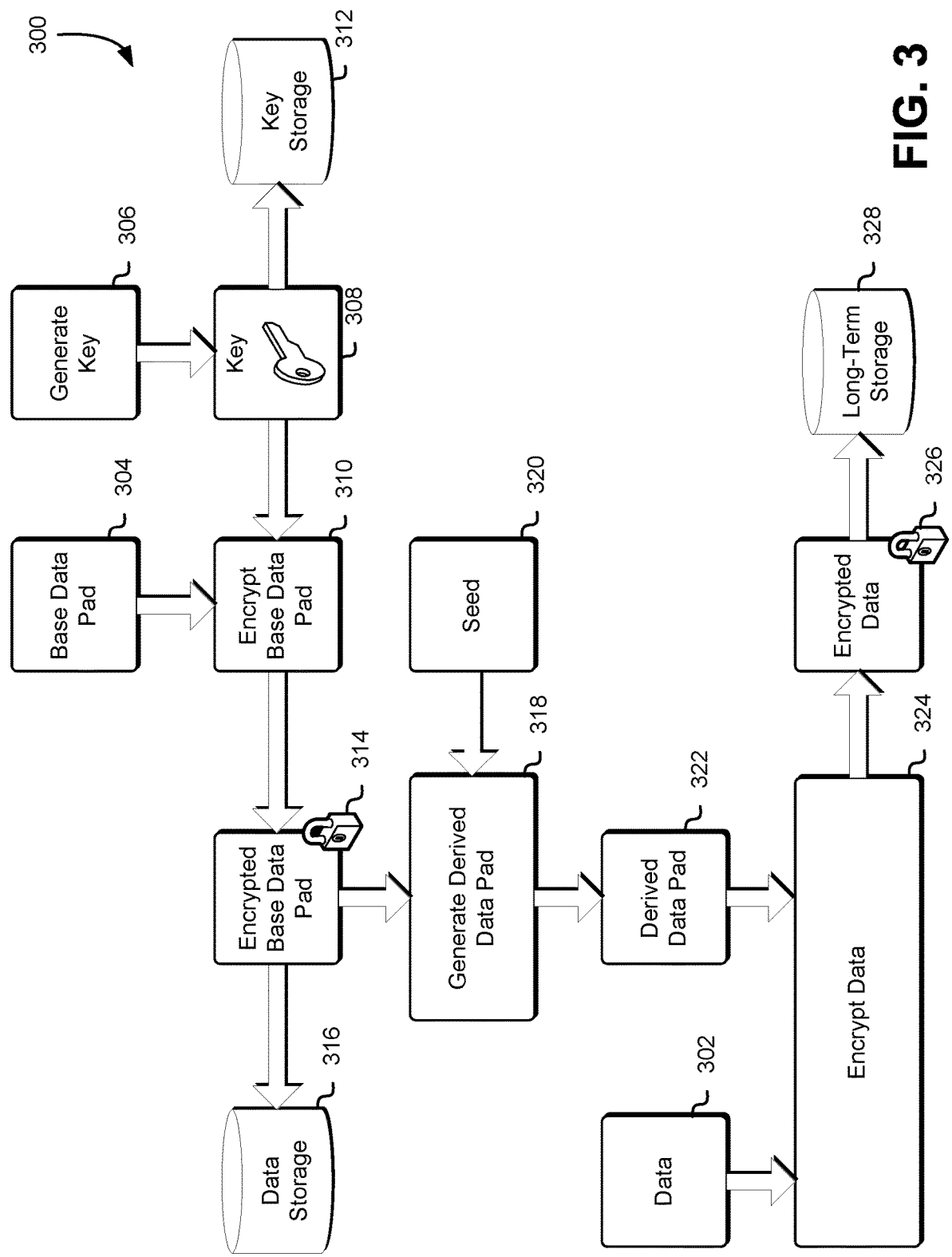
FIG. 3 illustrates an example environment where data is encrypted using an encrypted data pad and stored in long-term storage using a data encryption service.

FIG. 3 illustrates an example environment 300 where data is encrypted using an encrypted data pad and stored in long-term storage using a data encryption service as described in FIG. 1 and in accordance with an embodiment. In the example illustrated in FIG. 3, data 302 is encrypted by the data encryption service. First, a base data pad 304 may be generated and/or retrieved as described above. Next, a key 308 may be generated 306 using, for example, a cryptographic key service of the computing resource service provider. A cryptographic key service is a service that is configured to generate and/or manage cryptographic keys using one or more key generation algorithms. The cryptographic keys may be generated randomly or may be generated based on some input data. For example, a cryptographic key service may generate a cryptographic key from a set of data provided by a customer including, but not limited to, a customer specific key. The cryptographic key service may also manage the storage of cryptographic keys in secure storage environments such as, for example, using a trusted platform module ("TPM"), using a hardware security module ("HSM"), using a physically unclonable function ("PUF"), and/or using an Enclave.

The key 308 may then be used to encrypt the base data pad 310 to produce an encrypted base data pad 314. In an embodiment, the key 308 is stored in key storage 312 which may be secure storage managed by the cryptographic key service, or may be secure storage managed by the data encryption service, or may be secure storage managed by some other service of the computing resource service provider.

The encrypted base data pad 314 may then be used to generate the derived data pad 318 using a seed 320 as described above. In an embodiment, the encrypted base data pad 314 is stored in data storage 316 and the base data pad 304 is discarded. In another embodiment, the base data pad 304 is stored in data storage 316. The data 302 and the derived data pad may be combined to encrypt the data 324 as described above, and the encrypted data 326 may be stored in long-term data 328, also as described above.

In an embodiment, the encrypted base data pad 314 is decrypted prior to being used to generate the derived data pad 318. In another embodiment, the encrypted base data pad 314 is not decrypted prior to being used to generate the derived data pad 318 and is, instead, used as encrypted. As with the base data pad 204 described in connection with FIG. 2, the encrypted base data pad 314 may be used for a limited number of times before the encrypted base data pad 314 is exhausted. Upon such exhaustion, the encrypted base data pad 314 may then be stored in long-term storage and may be periodically re-encrypted with then current state of the art encryption as described above.

Figure 4:
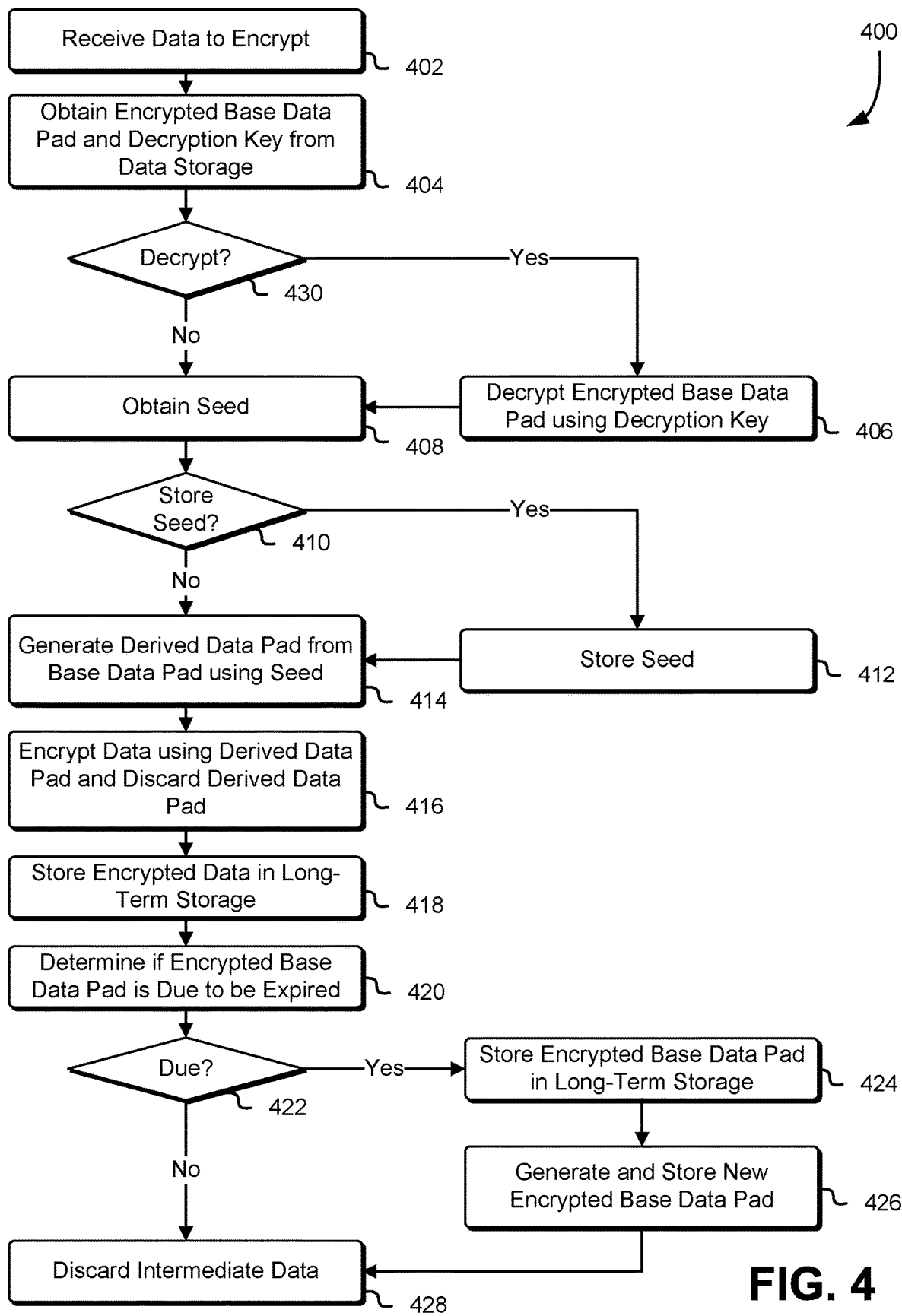
FIG. 4 illustrates an example process for encrypting and storing data in long-term storage using a data encryption service.

FIG. 4 illustrates an example process 400 for encrypting and storing data in long-term storage using a data encryption service as described in FIG. 1 and in accordance with an embodiment. A data encryption service such as the data encryption service 114 described in connection with FIG. 1 may perform the example process 400 described in connection with FIG. 4. The data encryption service may first receive 402 the data to encrypt and may obtain 404 the encrypted base data pad and the decryption key from data storage. In the example illustrated in FIG. 4, the data encryption service may determine 430 whether to decrypt the encrypted base data pad using the decryption key. If the data encryption service does determine 430 to decrypt the encrypted base data pad using the decryption key, the decryption service decrypts 406 the encrypted base data pad using the decryption key. If the data encryption service does not determine 430 to decrypt the encrypted base data pad using the decryption key, the data encryption service uses the encrypted base data pad in encrypted form.

The data encryption service may then obtain 408 or generate the seed. The data encryption service may next determine 410 whether to store the seed. In an embodiment where the seed is generated using, for example, a hash of an identifier of the data to be encrypted, the data encryption service may determine 410 not to store the seed. In an embodiment where the seed is randomly generated, the data encryption service may determine 410 to store the seed. If the data encryption service does not determine 410 to store the seed, the data encryption service may next generate 414 the derived data pad from the decrypted base data pad (or, the encrypted base data pad) using the seed. If the data encryption service does determine 410 to store the seed, the data encryption service may then store 412 the seed and then may generate 414 the derived data pad from the base data pad (e.g., the encrypted base data pad or the decrypted base data pad) using the seed. The data encryption service may next encrypt 416 the data using the derived data pad and may discard the derived data pad after the encryption of the data is complete. The data encryption service may then store 418 the encrypted data in long-term storage as described herein.

In the example process 400 illustrated in FIG. 4, the data encryption service may next determine 420 if the encrypted base data pad is due to be expired based on, for example, a limited number of uses for the encrypted base data pad. If the data encryption service does determine 422 that the encrypted base data pad is due to be expired, the data encryption service may store 424 the encrypted base data pad in long-term storage as described above and may generate 426 and store a new encrypted base data pad using, for example, a new encryption key provided to encrypt the new base data pad. Finally, the data encryption service may discard any intermediate data used to perform the operations described in the example process 400 illustrated in FIG. 4.

Figure 5:
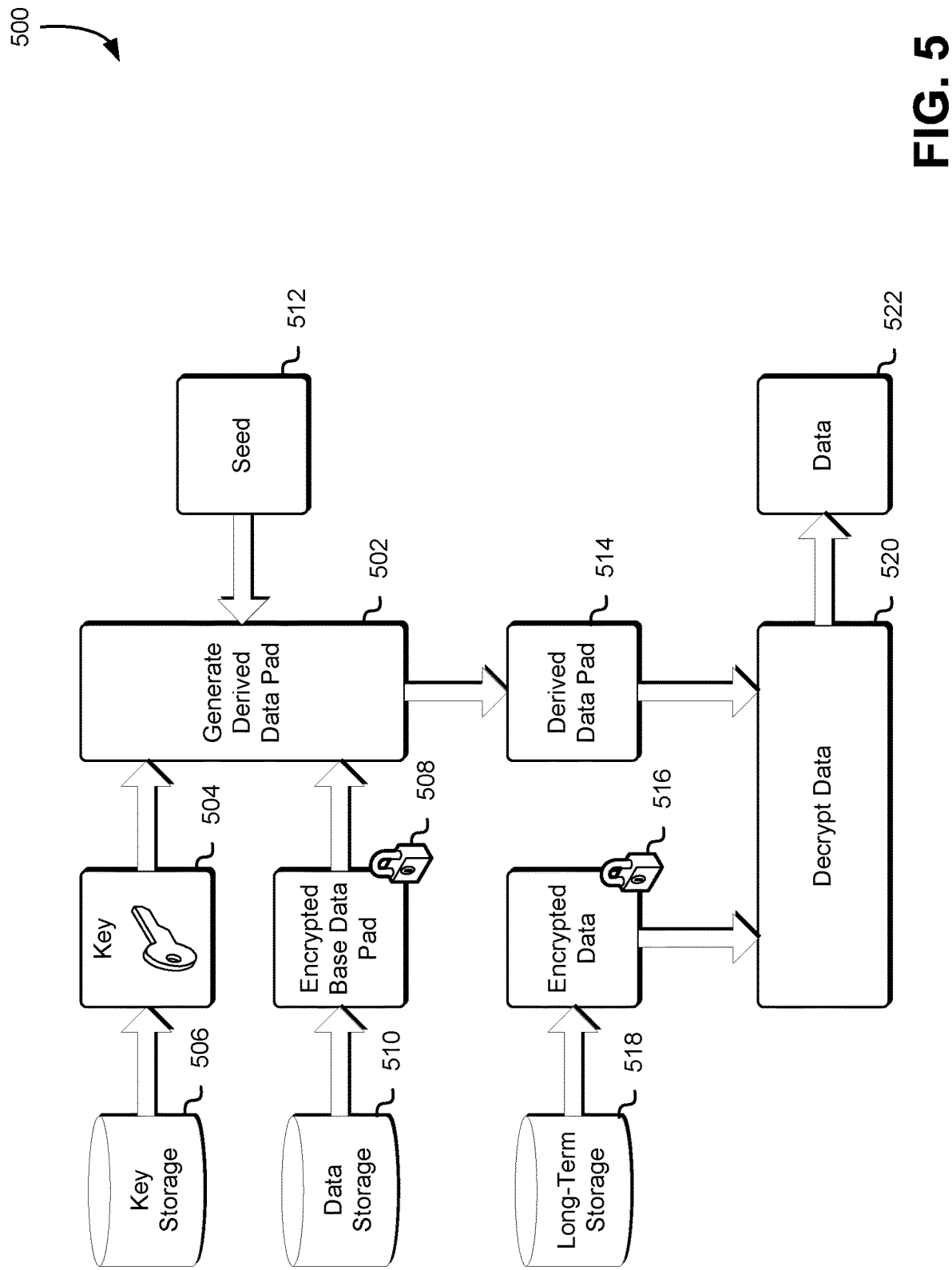
FIG. 5 illustrates an example environment where encrypted data stored in long-term storage is decrypted using a data encryption service.

FIG. 5 illustrates an example environment 500 where encrypted data stored in long-term storage is decrypted using a data encryption service as described in FIG. 1 and in accordance with an embodiment. In the example illustrated in FIG. 5, encrypted data 516 is encrypted by the data encryption service. A key 504 is obtained from key storage 506 and an encrypted base data pad 508 is obtained from data storage 510. The key 504 is the key that was used to encrypt the encrypted base data pad 508 using techniques described herein. The encrypted base data pad 508 is the base data pad that was used to encrypt the encrypted data 516, also using techniques described herein. In an embodiment, the encrypted data 516 was encrypted and stored in long-term storage 518 years, decades, or centuries earlier. In such an embodiment, the encrypted base data pad 508 may have been retrieved from data storage 510 a plurality of times and re-encrypted with a new key 504 using state of the art encryption techniques at the time of the re-encryption. In an embodiment where the encrypted data 516 was encrypted and stored in long-term storage 518 years, decades, or centuries earlier, the data storage 510 for the encrypted base data pad 508 and/or the key storage 506 for the key 504 may also be long-term storage.

The data encryption service may then generate the derived data pad 502 from the key 504 and the encrypted base data pad 508 using operations described herein. That is, the encrypted base data pad 508 may first be decrypted using the key 504, and then the derived data pad 514 may be generated from the base data pad using the seed 512 as described above. It should be noted that, in the example illustrated in FIG. 5, the encrypted base data pad 508 is used to generate the derived data pad 514. That is, the encrypted base data pad 508 may be directly used by the data encryption service and combined with the seed 512 to generate the derived data pad 514. The data encryption service may obtain or generate a seed 512 to generate the derived data pad 502 from the key 504 and the encrypted base data pad 508 as described above. In an embodiment, the encrypted base data pad 508 is decrypted before it is used to generate the derived data pad 514 as described above.

The data encryption service may next produce the data 522 (i.e., the result of the decryption operation) by performing one or more operations to decrypt the data 520 using the encrypted data 516 and the derived data pad 514. In an embodiment where the derived data pad 514 was XORed with the data 520 to generate the encrypted data, the data encryption service can produce the data 522 by XORing the encrypted data 516 and the derived data pad 514. In an embodiment where the encrypted data 516 was generated using a layered encryption technique (as described below), the one or more operations to decrypt the data 520 using the encrypted data 516 and the derived data pad 514 can include multiple decryption operations with multiple input data objects (e.g., the encrypted data 516), multiple intermediate output data objects (e.g., the data), and multiple cryptographic keys or secretes (e.g., the seed 512 and/or the key 504).

Figure 6:
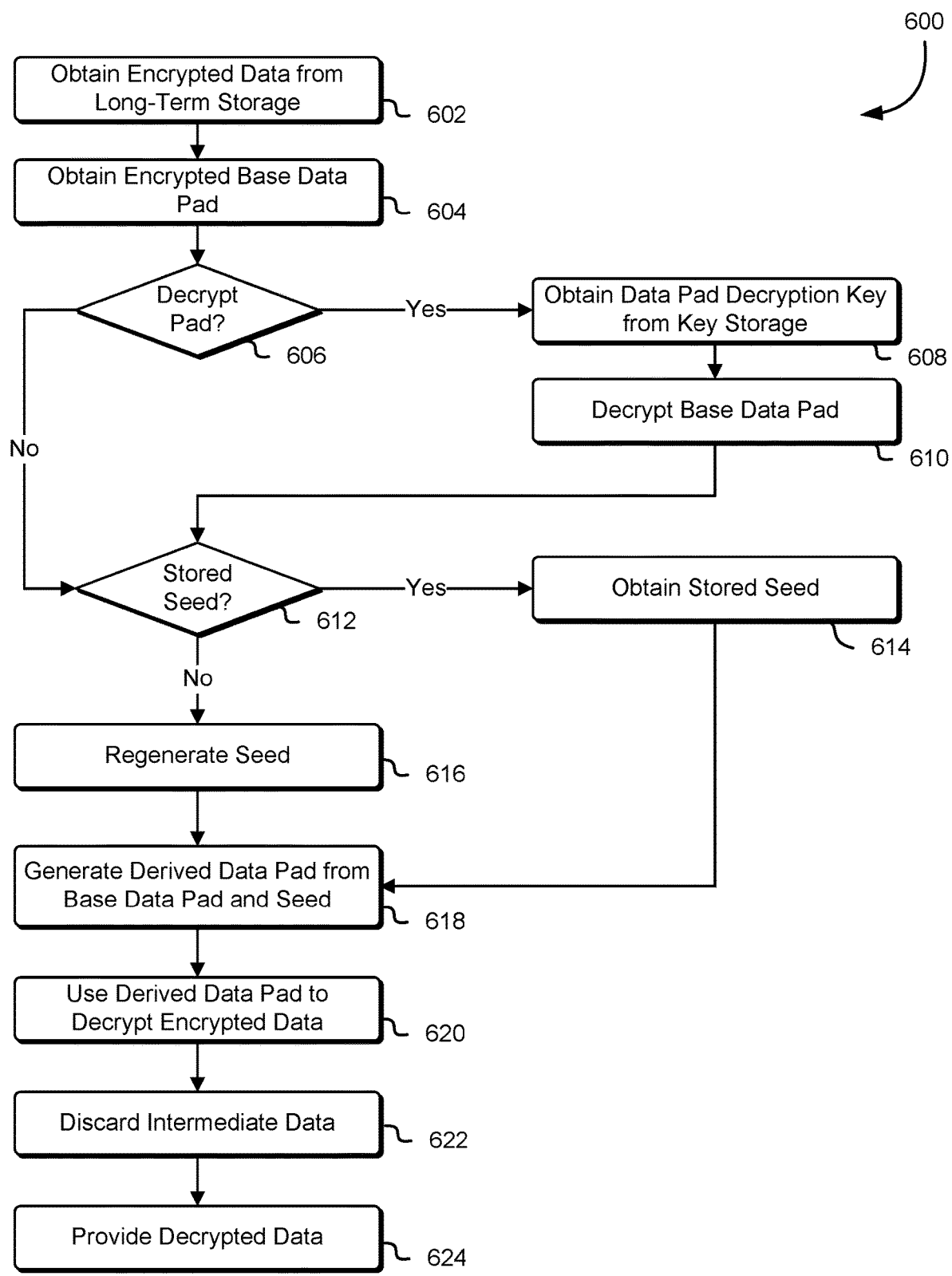
FIG. 6 illustrates an example process for decrypting data stored in long-term storage using a data encryption service.

FIG. 6 illustrates an example process 600 for decrypting data stored in long-term storage using a data encryption service as described in FIG. 1 and in accordance with an embodiment. A data encryption service such as the data encryption service 114 described in connection with FIG. 1 may perform the example process 600 described in connection with FIG. 6. The data encryption service may first obtain 602 the encrypted data from long-term storage (i.e., the data to decrypt). The data encryption service may next obtain 604 the corresponding encrypted base data pad from storage. In an embodiment, the encrypted base data pad is stored in long-term storage. The data encryption service may then determine 606 whether the data pad used to encrypt the encrypted data was decrypted prior to being used to generate the derived data pad. If the data encryption service does determine 606 that the data pad used to encrypt the encrypted data was decrypted prior to being used to generate the derived data pad, the data encryption service may then obtain 608 the data pad decryption key from key storage and use that decryption key to decrypt 610 the base data pad.

The data encryption service may next determine 612 whether the seed used to generate the derived data pad from the encrypted base data pad or the decrypted base data pad was generated from the data (e.g., from a data identifier) and not stored or was generated (e.g., randomly) and stored, both as described above. If the data encryption service does determine 612 that the seed used to generate the derived data pad from the encrypted base data pad or the decrypted base data pad was generated from the data (e.g., from a data identifier) and not stored, the data encryption service may regenerate 616 the seed. If the data encryption service does determine 612 that the seed used to generate the derived data pad from the encrypted base data pad or the decrypted base data pad was generated (e.g., randomly) and stored, the data encryption service may obtain 614 the stored seed from data storage.

The data encryption service may next generate 618 the derived data pad by applying the regenerated or obtained seed and may use 620 the derived data pad to decrypt the encrypted data. It should be noted that, as described herein, the operations to use 620 the derived data pad to decrypt the encrypted data may require multiple decryption operations with multiple cryptographic keys, seeds, or secrets. Finally, the data encryption service may discard 622 intermediate data used in the decryption process (e.g., the base data pad, the seed, and the decryption key) and may then provide 624 the decrypted data.

Figure 7:
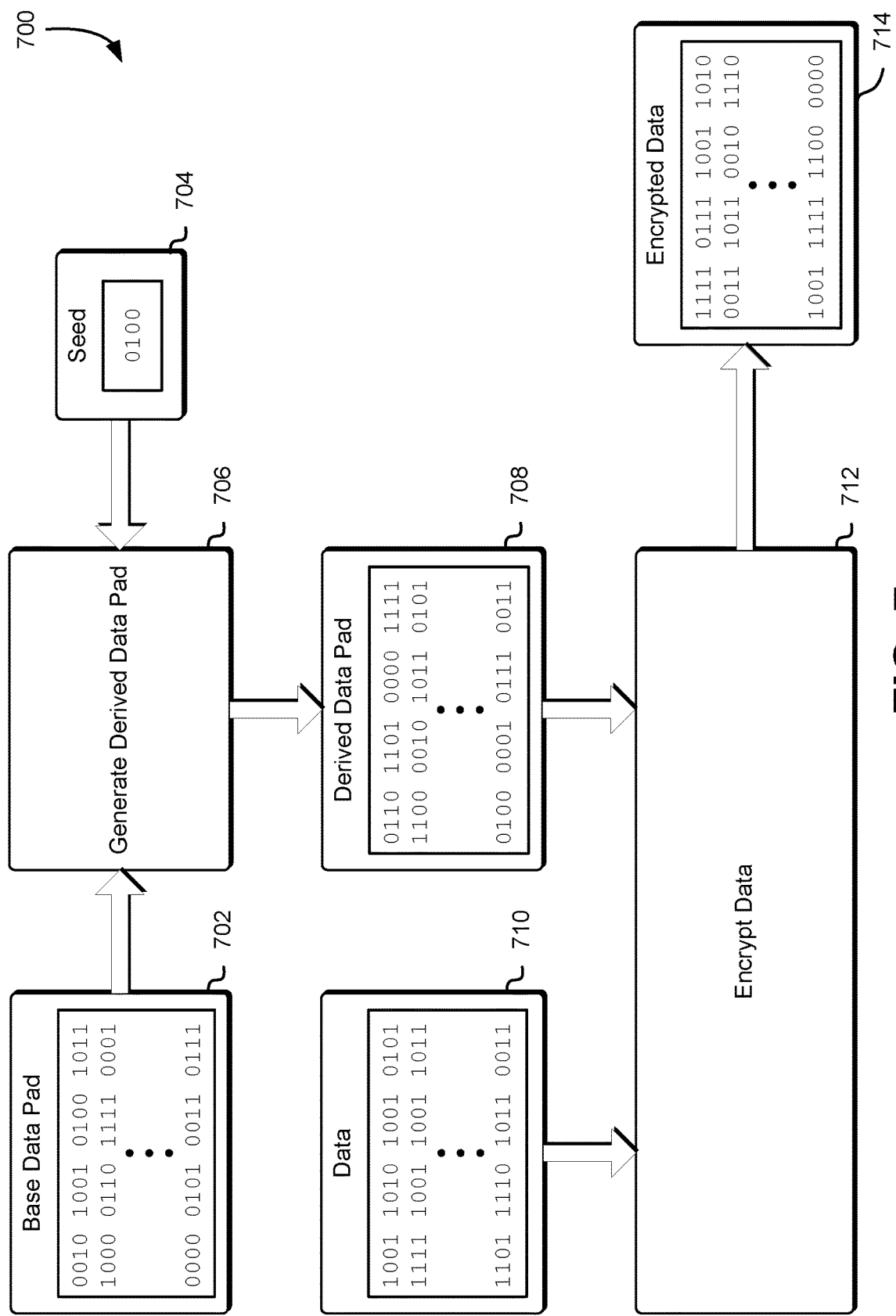
FIG. 7 illustrates an example environment where data is encrypted using an encrypted data pad for storage using a data encryption service.

FIG. 7 illustrates an example environment 700 where data is encrypted using an encrypted data pad for storage using a data encryption service as described in FIG. 1 and in accordance with an embodiment. The example illustrated in FIG. 7 shows simplified versions of data pads, data, and encrypted data that are generated using an XOR operation as described above.

In the example illustrated in FIG. 7, a base data pad 702 is combined with a seed 704 to generate 706 a derived data pad 708. The base data pad 702 may be an encrypted base data pad as described above. In the example illustrated in FIG. 7, each four bits of the base data pad are XORed with the seed to produce the derived data pad 708. For example, the first four bits of the base data pad 702 (e.g., 0010) are XORed with the four bits of the seed 704 (e.g., 0100) to produce the first four bits of the derived data pad 708 (e.g., 0110). An XOR operation is an example of an invertible bitwise operation that may be used to combine data, data pads, and/or seeds as described herein. It should be noted that the example of using an XOR operation to generate the derived data pad 708 illustrated in FIG. 7 is used for illustrative purposes and other methods of combining data with a seed to increase the mathematical complexity of the encryption may be considered as within the scope of the present disclosure.

The data 710 may then be combined with the derived data pad 708 to encrypt 712 the data and produce the encrypted data 714. In the example illustrated in FIG. 7, the data 710 is combined with the derived data pad 708 to encrypt 712 the data and produce the encrypted data 714 by XORing the data 710 and the derived data pad 708. In the example illustrated in FIG. 7, the bits of the data 710 are XORed with the corresponding bits of the derived data pad 708. For example, the first four bits of the data 710 (e.g., 1001) are XORed with the first four bits of the derived data pad 708 (e.g., 0110) to produce the first four bits of the encrypted data 714 (e.g., 1111). It should be noted that, when decryption operations are performed, the first four bits of the encrypted data 714 (e.g., 1111) are XORed with the first four bits of the derived data pad 708 (e.g., 0110) to produce the first four bits of the data 710 (e.g., 1001).

Figure 8:
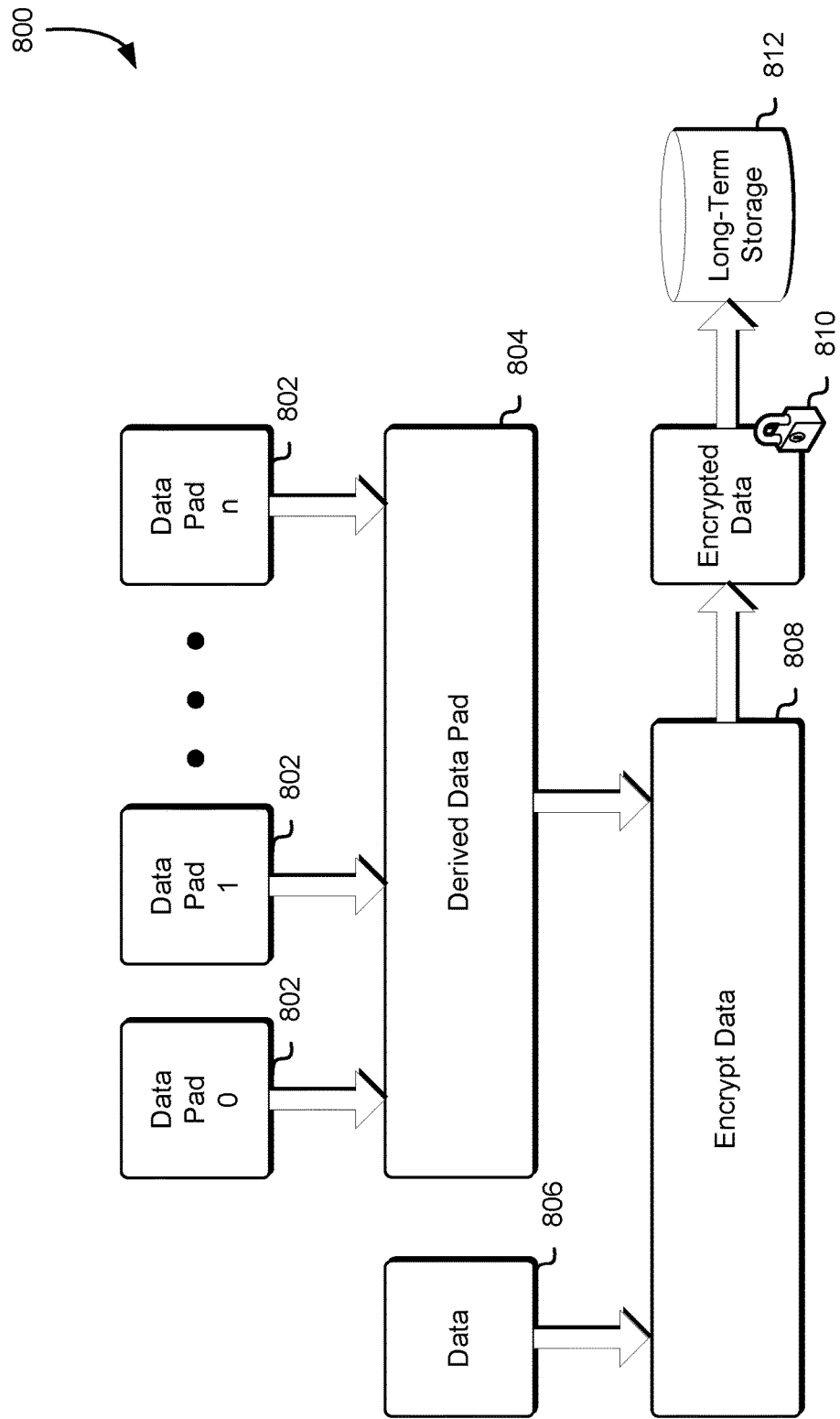
FIG. 8 illustrates an example environment where data is encrypted using a plurality of data pads and stored in long-term storage using a data encryption service.

FIG. 8 illustrates an example environment 800 where data is encrypted using a plurality of data pads and stored in long-term storage using a data encryption service as described in FIG. 1 and in accordance with an embodiment. In the example illustrated in FIG. 8, a plurality of data pads 802 are combined to generate a derived data pad 804. The plurality of data pads 802 may be unencrypted base data pads or may be encrypted base data pads. The plurality of data pads 802 may also be derived data pads (i.e., may be generated using a plurality of seeds as described above). The plurality of data pads 802 may be combined using multiple XOR operations or may be combined using some other technique. The derived data pad 804 may then be combined with the data 806 to encrypt 808 the data, and the encrypted data 810 may be stored in long-term storage 812 as described herein.

In an embodiment, the plurality of data pads 802 are stored in multiple locations (e.g., in multiple datacenters) to increase the difficulty of obtaining the secrets to perform the decryption without authorization because such unauthorized decryption would require compromising multiple location.

In another embodiment, the plurality of data pads 802 are selected from a larger set of data pads based on a key or combination. For example, there may be 16 data pads in the larger set of data pads and a "combination" for the encryption of the data 806 may be specified by a user or customer. The "combination" may specify four data pads in the plurality of data pads 802 and may further specify that the four data pads are number 12, number 4, number 6, and number 7. This combination (e.g., 12-4-6-7) of data pads that are used for the plurality of data pads 802 would then be needed to regenerate the derived data pad used for the decryption. It should be noted that the number of data pads in the larger set of data pads and the number data pads 802 in the plurality of data pads are, in some embodiments, larger than 16 and 4 respectively.

Figure 9:
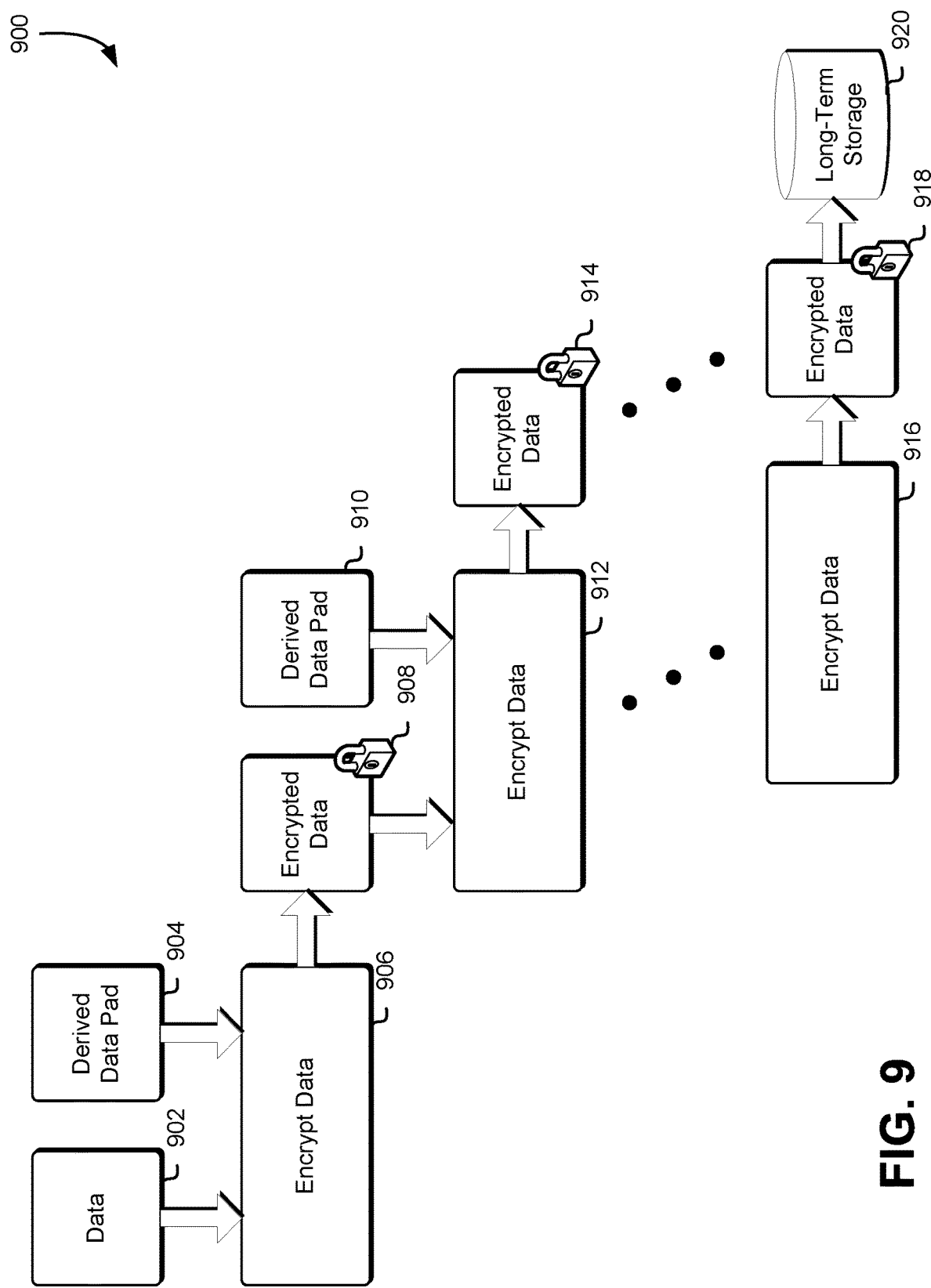
FIG. 9 illustrates an example environment where data is encrypted using layered encryption with a plurality of data pads and stored in long-term storage using a data encryption service.

FIG. 9 illustrates an example environment 900 where data is encrypted using layered encryption with a plurality of data pads and stored in long-term storage using a data encryption service as described in FIG. 1 and in accordance with an embodiment. In the example illustrated in FIG. 9, data 902 and a derived data pad 904 are combined to encrypt 906 the data and produce encrypted data 908. This encrypted data 908 is then combined with a second derived data pad 910 to further encrypt 912 the data to produce the second encrypted data 914. This process is repeated a number of times until the final combination to encrypt 916 the data that produces the encrypted data 918 that is stored in long-term storage 920.

As described above, increasing the number of iterations for the layered encryption process may increase the randomness of the encrypted data, may increase the limit on the number of iterations before a data pad is exhausted, and may increase the difficulty of obtaining the secrets used in the encryption. The number of iterations of the layered encryption process may be based at least in part on a property of the set of data to encrypt. For example, data that is to be encrypted more securely may have an increased number of iterations. In an embodiment, the data used to generate the derived data pads (e.g., the derived data pad 904 and the derived data pad 910) such as, for example, the encrypted base data pads and/or the seeds, is stored in multiple locations as described above, thereby increasing the difficulty of obtaining the secrets.

The derived data pad 904, the derived data pad 910, and other derived data pads not illustrated may be generated or obtained using the techniques described above. Although not shown in FIG. 9, intermediate data is discarded after it is used for the encryption operations. For example, after the encrypted data 908 is generated, the data 902 and the derived data pad 904 are no longer needed and may be immediately discarded. Discarding intermediate data may prevent unauthorized release of such data.

Figure 10:
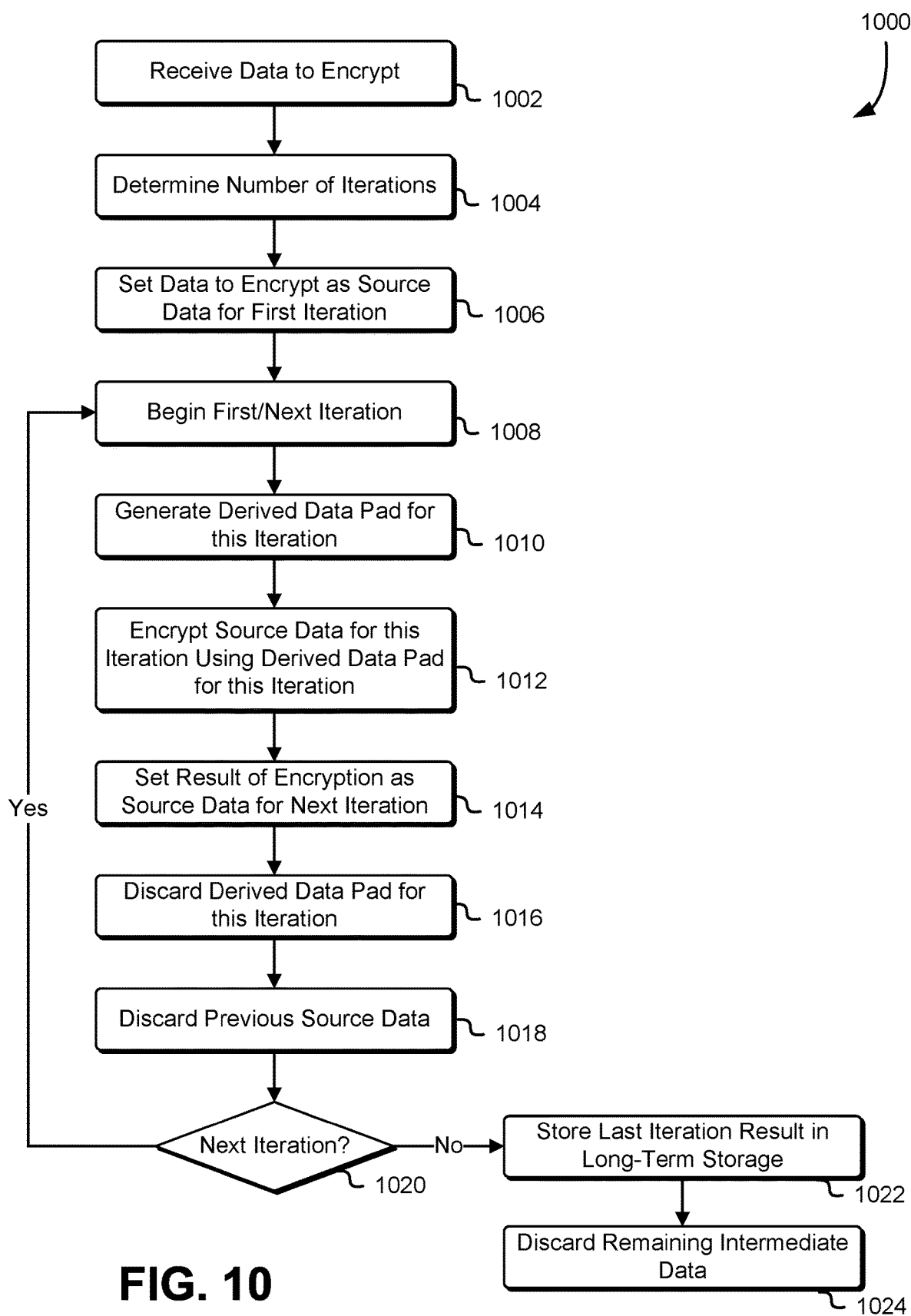
FIG. 10 illustrates an example process for encrypting data using layered encryption with a plurality of data pads and storing the data in long-term storage using a data encryption service.

FIG. 10 illustrates an example process 1000 for encrypting data using layered encryption with a plurality of data pads and storing the data in long-term storage using a data encryption service as described in FIG. 1 and in accordance with an embodiment. A data encryption service such as the data encryption service 114 described in connection with FIG. 1 may perform the example process 1000 described in connection with FIG. 10. The data encryption service may first receive 1002 the data to encrypt and may determine 1004 the number of iterations that may be used in the encryption. The number of iterations may be set by a customer associated with the data to encrypt or may be set by policy.

The data encryption service may then set 1006 the data to encrypt as the source data for the first iteration and may begin 1008 the first iteration. In the first iteration, the data encryption service first generates 1010 a derived data pad for this iteration using the techniques described herein and encrypts 1012 the source data (e.g., the data to encrypt in the first iteration and, as described below, the result of the previous encryption for later iterations) using the derived data pad for this iteration. The data encryption service next sets 1014 the result of the encryption (i.e., the encrypted data for this iteration) as the source data for the next iteration (e.g., a later iteration). Next the data encryption service may discard 1016 the derived data pad for this iteration and may discard 1018 the previous source data (e.g., the data to encrypt in the first iteration and the result of the previous encryption in subsequent iterations).

Finally, the data encryption service may determine 1020 if there are more iterations and, if there are, may begin 1008 the next iteration with the new source data. If the data encryption service does not determine 1020 that there are more iterations, then the data encryption service may store 1022 the result of the encryption of the last iteration in long-term data as the result and may discard 1024 any remaining intermediate data.

It should be noted that a layered decryption, while not illustrated in FIG. 10, is the reverse of the example process 1000 illustrated in FIG. 10. For layered decryption, the stored encrypted data is set as the source for the first iteration and, for each iteration, the appropriate derived data pad obtained and used to decrypt that stored encrypted data using the techniques described herein. The result of that decryption is then set as the source for the next iteration until, after the number of iterations, the original data is produced.

Figure 11:
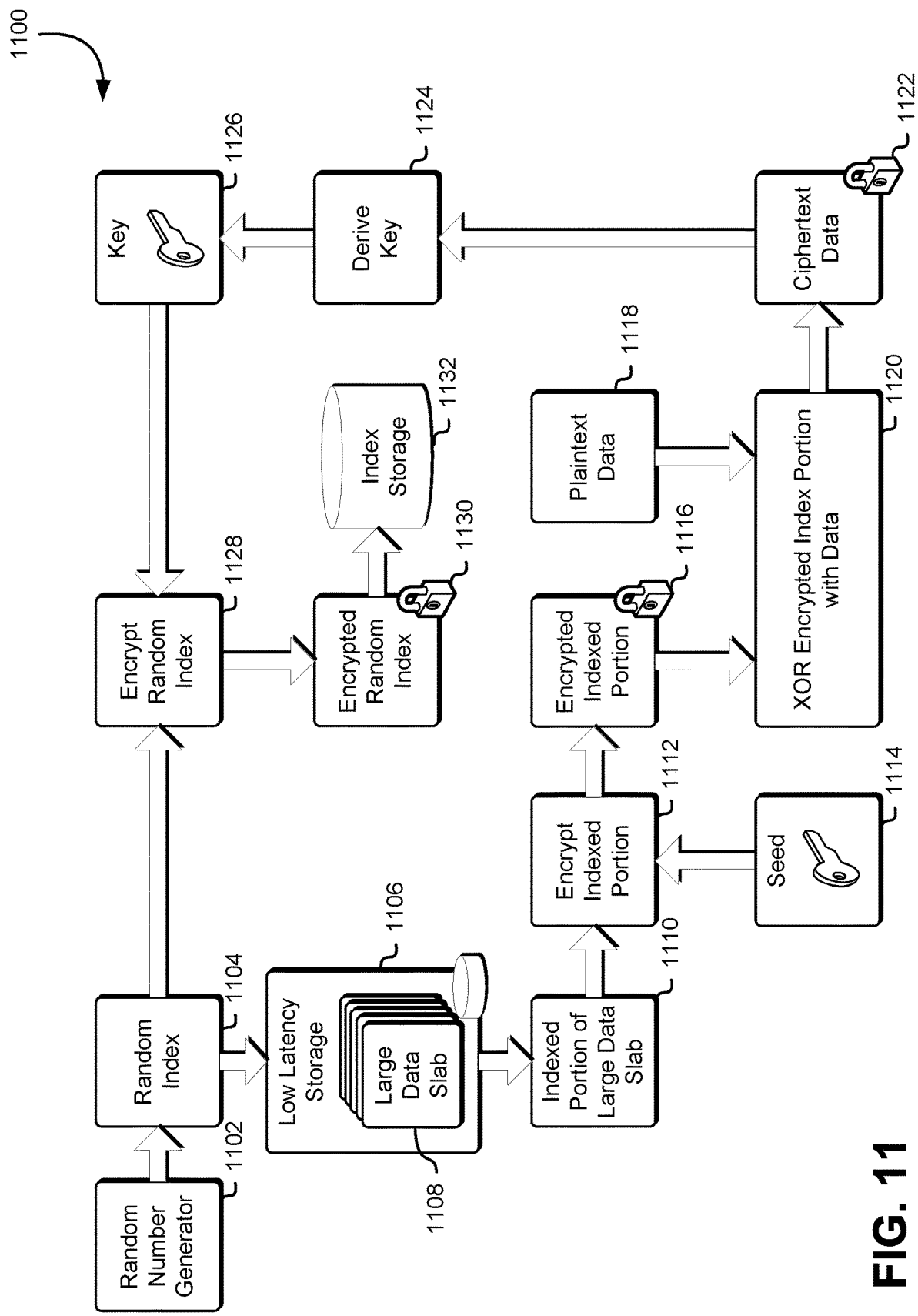
FIG. 11 illustrates an example environment where a data is encrypted with a large data slab using a data encryption service.

FIG. 11 illustrates an example environment 1100 where a data is encrypted with a large data slab using a data encryption service as described in FIG. 1 and in accordance with an embodiment. In the example illustrated in FIG. 11, smaller data and/or short-term data may be encrypted using layered encryption techniques that rely on the difficulty in obtaining the secrets used for the encryption such as those described above. Plaintext data 1118 that is to be encrypted (also referred to herein as "data to encrypt") is received by a data encryption service. Such data may be smaller data such as, for example, credit card data or SSL tokens that is encrypted for shorter periods of time (e.g., minutes, hours, days, or weeks) as opposed to the long-term data described above. The example illustrated in FIG. 11 illustrates details of a first iteration of a layered encryption of such short-term data.

To do a layered encryption of short-term data, a random index 1104 is generated using a random number generator 1102. The random index 1104 is an index into a large data slab 1108 that may be stored in low-latency storage 1106. The large data slab 1108 is a large set of data. As with the discussion of the layered encryption of long-term data, the encryption illustrated in FIGS. 11-18 relies on both mathematical complexity of the decryption operation and a difficulty in obtaining the secrets used in the encryption. In this example, the large data slab 1108 contains at least a petabyte ("PB") of data. A PB of data is a large amount of data that cannot be easily obtained without authorization. The amount of data in the large data slab prevents it from being downloaded over a network and also prevents it from being loaded onto removable media and physically taken from a datacenter.

The large data slab 1108 is random or pseudorandom data and is organized into a number of blocks of data such that each of the blocks is unique. As such, the size of the blocks of data in the large data slab 1108 is determined by the size of the large data slab 1108 or, conversely, the size of the large data slab 1108 is determined by the size of the blocks of data in the large data slab 1108. For example, if each of the data blocks is 32 bits (e.g., $2^5$ bits or $2^2$ bytes), there are $2^{32}$ unique data blocks that can be generated and so the large data slab can contain, at most, $2^{34}$ bytes of data (e.g., $2^{32}$ four-byte blocks) which is 16 gibibytes ("GiB") or a bit more than 16 gigabytes ("GB") of data. In another example, if each of the of the data blocks is 64 bits (e.g., $2^6$ bits or $2^3$ bytes), there are $2^{64}$ unique data blocks that can be generated and so the large data slab can contain, at most, $2^{67}$ bytes of data (e.g., $2^{64}$ eight-byte blocks) which is 64 exbibytes ("EiB") or a bit more than 64 exabytes ("EB") of data. For a 1 PB slab, a 64 bit block size allows sufficient diversity of random data to ensure that the blocks do not exhaust the available blocks.

It should be noted that once a block size is chosen for the large data slab, it cannot be reduced. For example, two simple 8-bit blocks are "01011000" and "10101000" which are unique. However, reducing the block size to 4-bits results in four blocks (e.g., "0101," "1000," "1010," and "1000") which are not unique. It should also be noted that once a block size is chosen for the large data slab, it can be increased. For example, four 4-bit blocks which are unique (e.g., "0101", "1001", "1010", and "1000") can be combined to produce two 8-bit blocks that are also unique (e.g., "01011001" and "10101000").

In the example illustrated in FIG. 11, the random index 1104 is an index into the large data slab 1108 and is used to select a random block from the large data slab. This random block is referred to herein as the indexed portion. The indexed portion of the large data slab 1110 is then encrypted 1112 using a seed 1114 as described below. The seed 1114 may be used as a key to encrypt the indexed portion of the large data slab 1110 to produce the encrypted index portion 1116. In an embodiment, the operation whereby the indexed portion of the large data slab 1110 is encrypted 1112 to produce the encrypted index portion 1116 is an electronic codebook ("ECB") mode encryption. The operation whereby the indexed portion of the large data slab 1110 is encrypted 1112 to produce the encrypted index portion 1116 may also be some other block cipher mode of encryption including, but not limited to, cipher block chaining ("CBC"), propagating cipher block chaining ("PCBC"), cipher feedback ("CFB"), output feedback ("OFB"), counter mode ("CM"), integer counter mode ("ICM"), segmented integer counter ("SIC") mode, or some other such block cipher mode of encryption.

The indexed portion of the large data slab 1110 may be an arbitrarily large portion of the large data slab 1108, the size of which may be based at least in part on the size of the data to encrypt (e.g., the plaintext data 1118). Similarly, the size of the encrypted indexed portion 1116 of the large data slab 1108 may also be based at least in part on the size of the indexed portion of the large data slab 1110. In an embodiment, the indexed portion of the large data slab 1110 and the encrypted index portion 1116 of the large data slab 1108 are at least the same size as the size of the plaintext data 1118. In an embodiment, the indexed portion of the large data slab 1110 and the encrypted index portion 1116 of the large data slab 1108 are the same size as the size of the plaintext data 1118. The encrypted indexed portion 1116 of the large data slab 1108 is then XORed 1120 with the plaintext data 1118 to produce a set of ciphertext data 1122, which may be stored or used by other services.

The ciphertext data 1122 (e.g., the result of the XOR operation) then may be used to derive 1124 a key 1126 using, for example, a cryptographic key service as described above. In an embodiment, the operation to derive 1124 the key 1126 is a hashing operation that produces a hash of the ciphertext data 1122 and uses the result of that hashing operation to derive 1124 the key 1126. The key 1126 may then be used to encrypt 1128 the random index 1104. The encrypted random index 1130 may then be stored in index storage 1132 so that it may be used to later decrypt the encrypted data. It should be noted that the key 1126 derived from the ciphertext data 1122 is not stored but is, instead, regenerated from the encrypted data during decryption and is used to decrypt the random index as described below.

Figure 12:
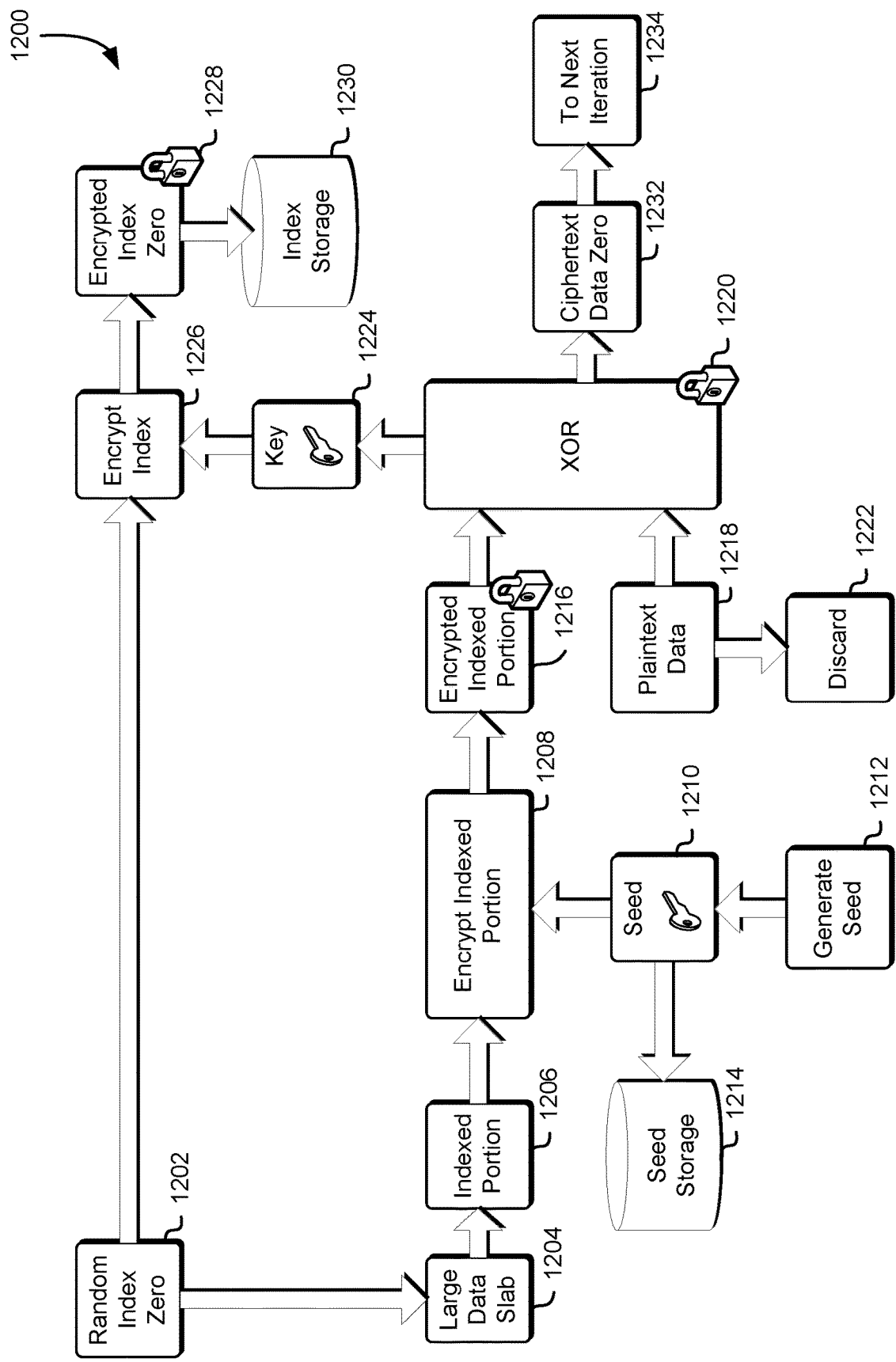
FIG. 12 illustrates an example environment where a first iteration of a multiple iteration data encryption using a large data slab is performed using a data encryption service.

FIG. 12 illustrates an example environment 1200 where a first iteration of a multiple iteration data encryption using a large data slab is performed using a data encryption service as described in FIG. 1 and in accordance with an embodiment. In the example illustrated in FIG. 12, random index zero 1202, which may be generated using a random number generator as described above, is the first random index into the large data slab 1204 as described above. The indexed portion 1206 of the large data slab 1204 is then encrypted 1208 using a seed 1210. The seed 1210 may be used as a key to encrypt the indexed portion 1206 of the large data slab 1204 to produce the encrypted index portion 1216 as described above. The seed 1210 is generated 1212 and stored in seed storage 1214. The seed 1210 may be randomly generated or may be generated from the data to be encrypted (e.g., may be an identifier of the data to be encrypted). The seed 1210 may be stored in seed storage 1214 so that it may be obtained during decryption or, in an embodiment where the seed 1210 is generated from the plaintext data 1218 (e.g., the data to encrypt), the seed 1210 may not be stored in seed storage 1214. In an embodiment, the seed is combined with a value (e.g., an iteration number) using a key derivation function to generate the seed. By combining an iteration number with the seed 1210 and using that value in the process where the indexed portion 1206 of the large data slab 1204 is encrypted 1208, some loss of cryptographic complexity that may result from randomly picking the same index twice in a single layered encryption can be mitigated (i.e., the iteration number increases the randomness of the resulting encrypted data).

When the indexed portion 1206 of the large data slab 1204 is encrypted 1208 using a seed 1210, the encrypted indexed portion 1216 of the large data slab 1204 is generated. The encrypted indexed portion 1216 of the large data slab 1204 is XORed 1220 with the plaintext data 1218 to produce the first set of ciphertext data, ciphertext data zero 1232. After the ciphertext data zero 1232 is generated, the plaintext data 1218 may be discarded 1222.

The ciphertext data zero 1232 is then used to derive a key 1224 as described above and that key is used to encrypt 1226 random index zero 1202. The encrypted index zero 1228 is then stored in index storage as described above. The ciphertext data zero 1232 is then used as the source data for the next iteration 1234, which is described in connection with FIG. 13.

Figure 13:
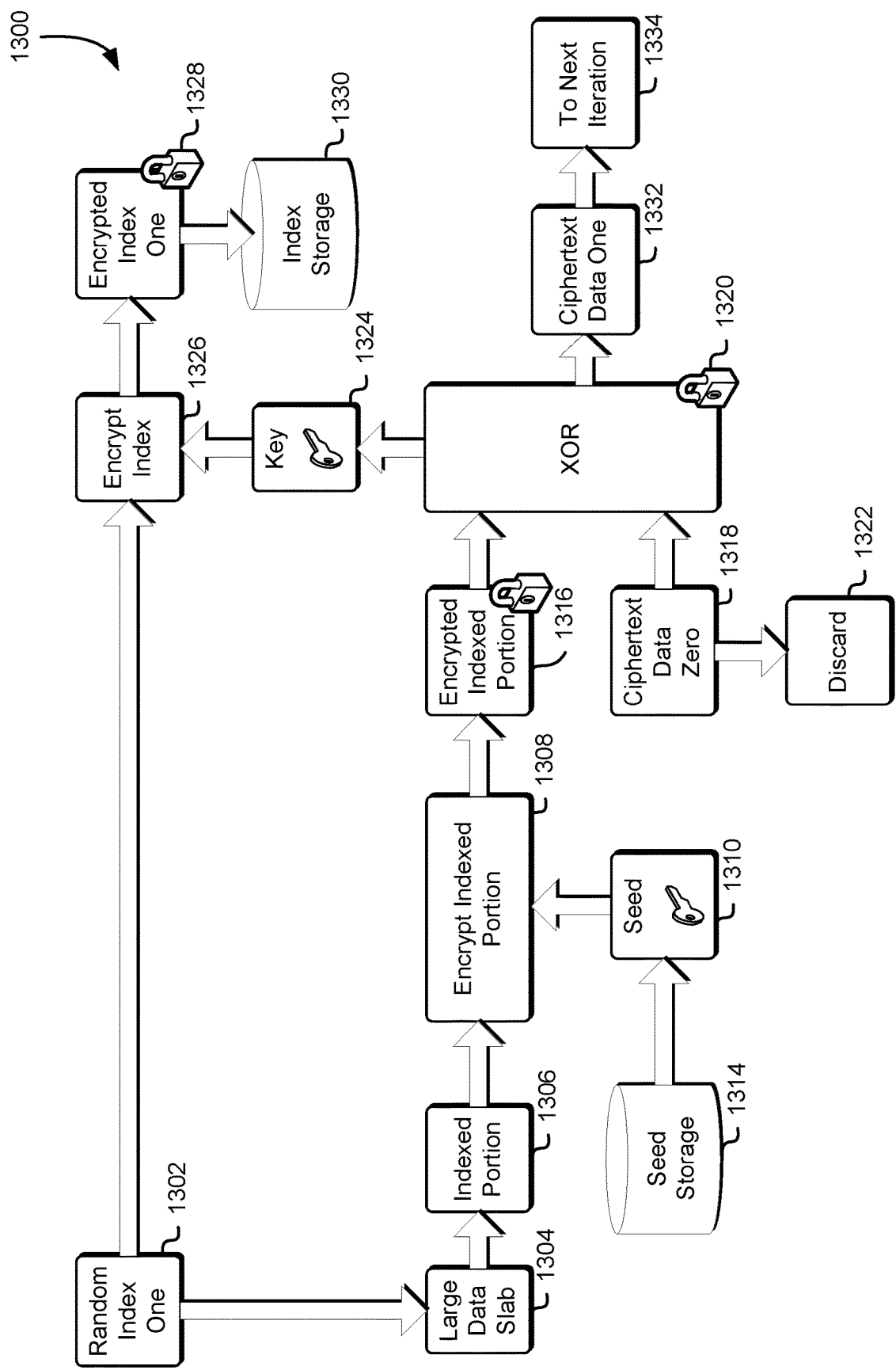
FIG. 13 illustrates an example environment where a second iteration of a multiple iteration data encryption using a large data slab is performed using a data encryption service.

FIG. 13 illustrates an example environment 1300 where a second iteration of a multiple iteration data encryption using a large data slab is performed using a data encryption service as described in FIG. 1 and in accordance with an embodiment. In the example illustrated in FIG. 13, random index one 1302, which may be generated using a random number generator as described above, is the second random index into the large data slab 1304. The indexed portion 1306 of the large data slab 1304 is then encrypted 1308 using a seed 1310 obtained from seed storage 1314. The seed 1310 may be used as a key to encrypt the indexed portion 1306 of the large data slab 1304 to produce the encrypted index portion 1316 as described above. The seed 1310 may be retrieved from the seed storage 1314 or it may be generated from the data to be encrypted, as described above.

When the indexed portion 1306 of the large data slab 1304 is encrypted 1308 using the seed 1310, the encrypted indexed portion 1316 of the large data slab 1304 is generated. The encrypted indexed portion 1316 of the large data slab 1304 is XORed 1320 with ciphertext data zero 1318 (i.e., the result of the previous iteration) to produce the second set of ciphertext data, ciphertext data one 1332. After ciphertext data one 1332 is generated, ciphertext data zero 1318 may be discarded 1322.

The ciphertext data one 1332 is then used to derive a key 1324 as described above and that key is used to encrypt 1326 random index one 1302. The encrypted index one 1328 is then stored in index storage as described above. The ciphertext data one 1332 is then used as the source data for the next iteration 1334, which is described in connection with FIG. 14.

Figure 14:
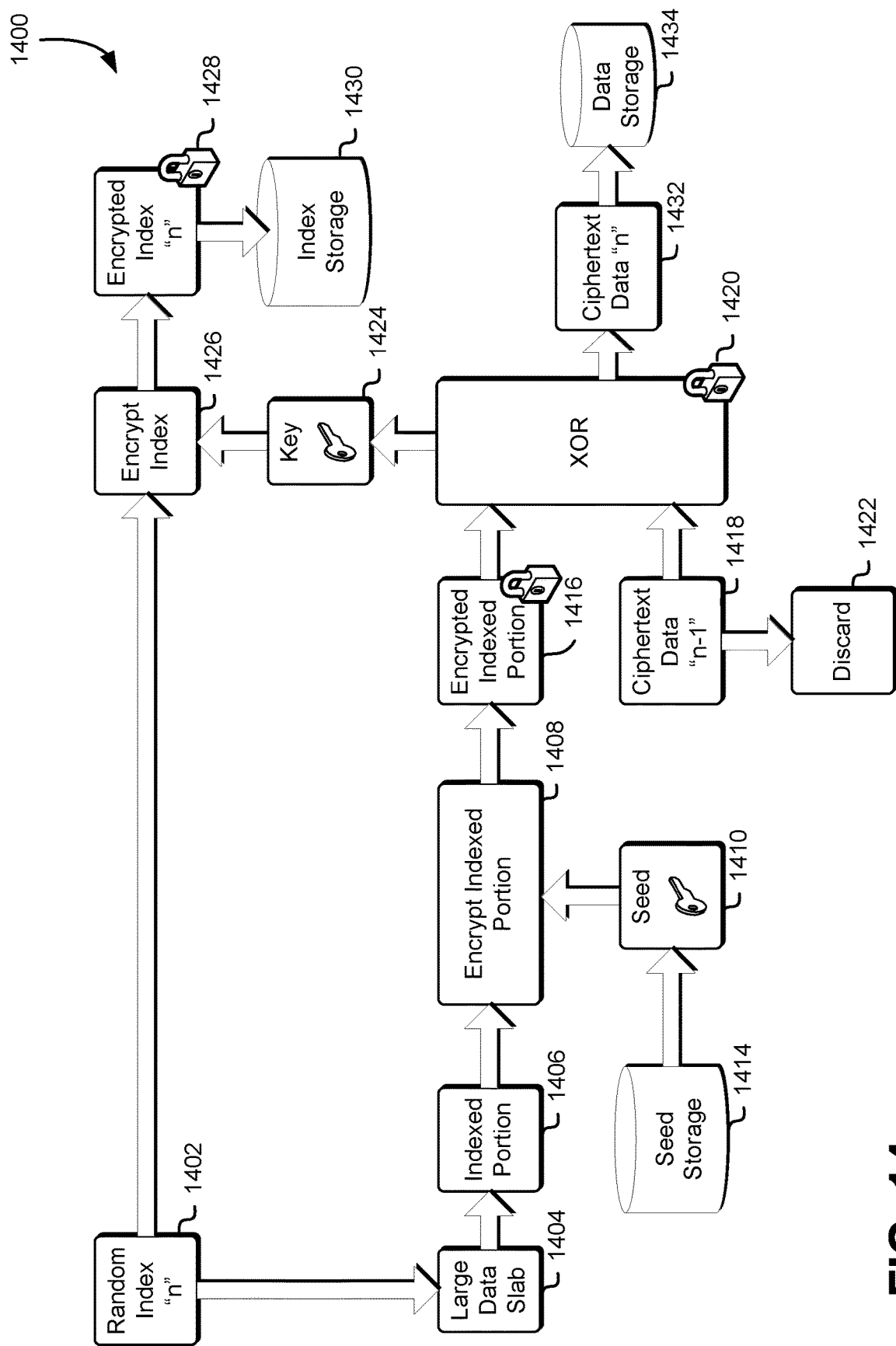
FIG. 14 illustrates an example environment where a final iteration of a multiple iteration data encryption using a large data slab is performed using a data encryption service.

FIG. 14 illustrates an example environment 1400 where a final iteration of a multiple iteration data encryption using a large data slab is performed using a data encryption service as described in FIG. 1 and in accordance with an embodiment. In the example illustrated in FIG. 14, random index "n" 1402, which may be generated using a random number generator as described above, is the final random index (denoted random index "n") into the large data slab 1404. The indexed portion 1406 of the large data slab 1404 is then encrypted 1408 using a seed 1410 obtained from seed storage 1414. The seed 1410 may be used as a key to encrypt the indexed portion 1406 of the large data slab 1404 to produce the encrypted index portion 1416 as described above. The seed 1410 may be retrieved from the seed storage 1414 or it may be generated from the data to be encrypted, as described above.

When the indexed portion 1406 of the large data slab 1404 is encrypted 1408 using the seed 1410, the encrypted indexed portion 1416 of the large data slab 1404 is generated. The encrypted indexed portion 1416 of the large data slab 1404 is XORed 1420 with ciphertext data "n−1" 1418 (i.e., the result of the previous iteration) to produce the last set of ciphertext data, ciphertext data "n" 1432. After ciphertext data "n" 1420 is generated, ciphertext data "n−1" 1418 may be discarded 1422.

The ciphertext data "n" 1432 is then used to derive a key 1424 as described above and that key is used to encrypt 1426 random index "n" 1402. The encrypted index "n" 1428 is then stored in index storage as described above. The ciphertext data "n" 1432 is stored in data storage 1434 and is the result of the encryption. After the layered encryption is complete, the ciphertext data "n" 1432 is in data storage, an encrypted key for each iteration is in index storage 1430, and the seed is in seed storage 1414.

Figure 15:
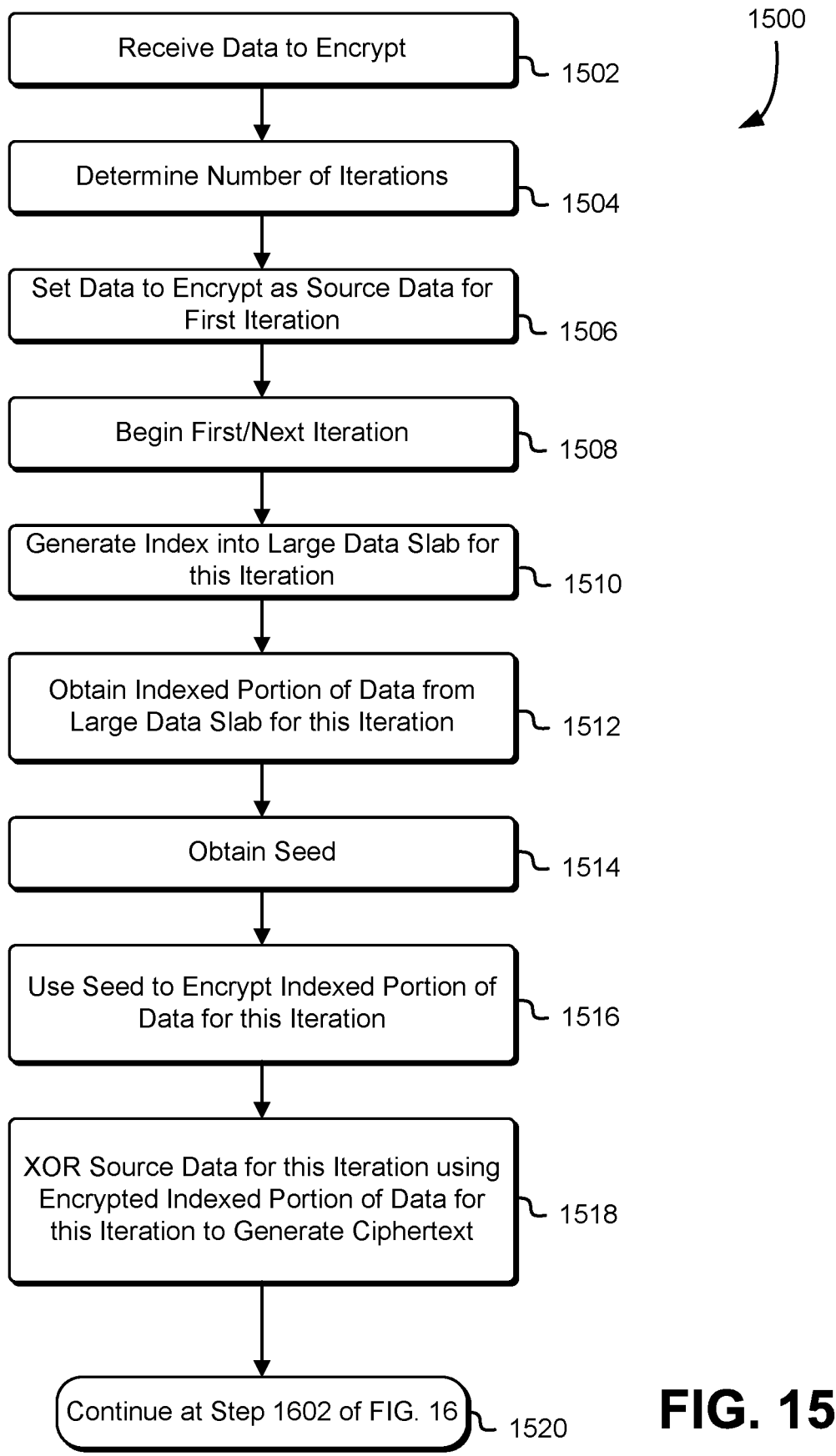
FIG. 15 illustrates a first part of an example process for performing a multiple iteration data encryption with a large data slab using a data encryption service.

FIG. 15 illustrates a first part 1500 of an example process for performing a multiple iteration data encryption with a large data slab using a data encryption service as described in FIG. 1 and in accordance with an embodiment. A data encryption service such as the data encryption service 114 described in connection with FIG. 1 may perform the first part 1500 of the example process described in connection with FIG. 15. The data encryption service may first retrieve 1502 a set of data to encrypt and may next determine 1504 the number of iterations for the layered encryption. In an embodiment, the number of iterations numbers in the tens (i.e., is between 10 and 99). The data encryption service may then set 1506 the data to encrypt as the source data for the first iteration.

The data encryption service may then begin 1508 the first iteration of the layered encryption. In the first iteration, the data encryption service may generate 1510 an index into the large data slab for this iteration using, for example, a random number generator. The data encryption service may use that index to obtain 1512 an indexed portion of the data (e.g., a data block) for this iteration from the large data slab. The data encryption service may next obtain 1514 the seed. In the first iteration, the data encryption service may generate the seed based on the data to encrypt or based on a random generation of the seed. Although not illustrated in FIG. 15, on the first iteration, the data encryption service may store the seed so that it may be obtained for subsequent iterations.

The data encryption service may next encrypt 1516 the indexed portion of the large data slab for this iteration using the seed as described above. The data encryption service may next XOR 1518 the source data using the encrypted indexed portion of the large data slab to generate the ciphertext for this iteration (also referred to herein as the "result for this iteration"). For the first iteration, the source data is the data to encrypt. In subsequent iterations, the source data is the result of the XOR operation from the previous iteration. The first part 1500 of the example process illustrated in FIG. 15 continues 1520 in the second part 1600 of the process, illustrated in FIG. 16.

Figure 16:
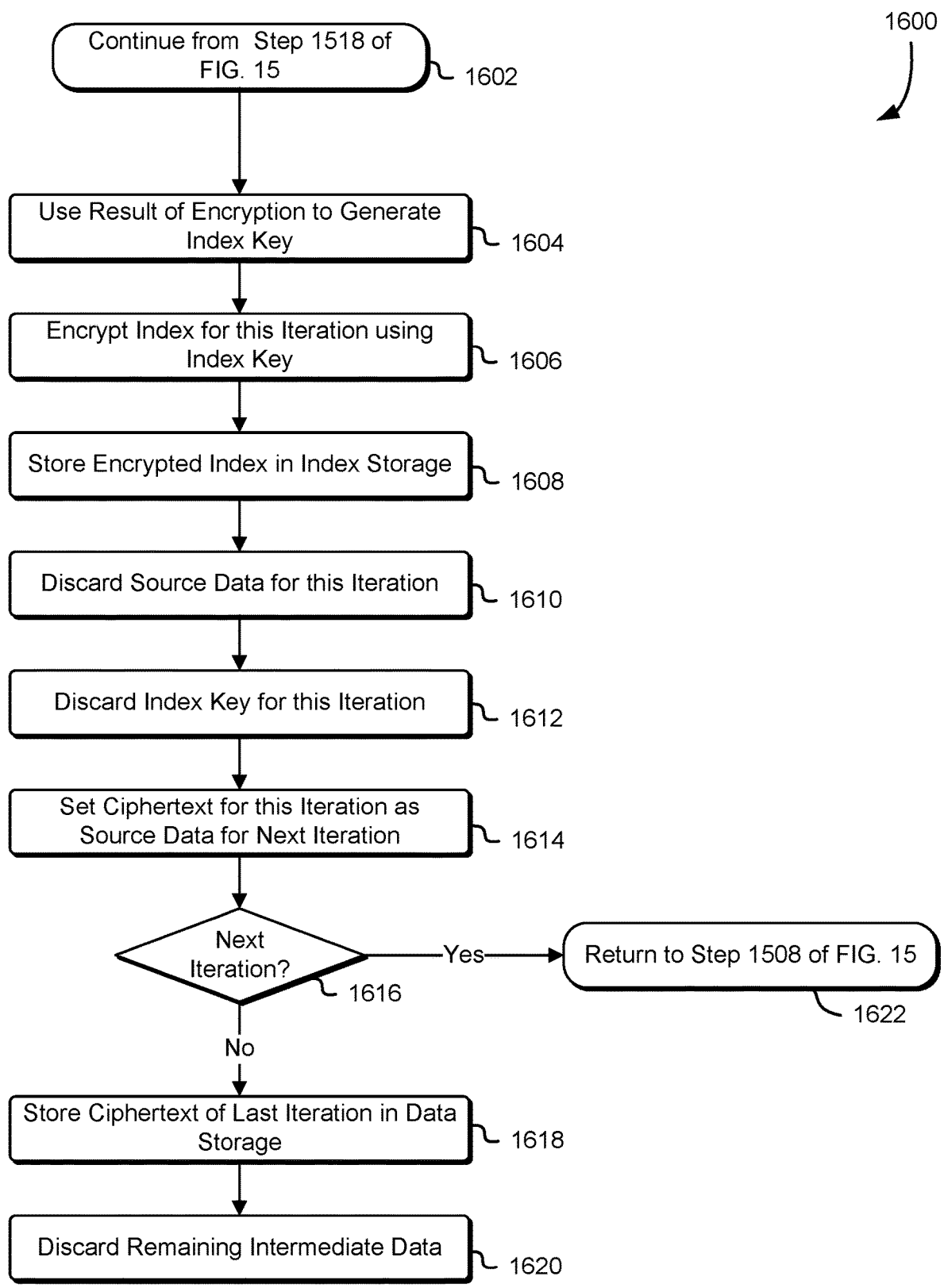
FIG. 16 illustrates a second part of an example process for performing a multiple iteration data encryption with a large data slab using a data encryption service.

FIG. 16 illustrates a second part 1600 of an example process for performing a multiple iteration data encryption with a large data slab using a data encryption service as described in FIG. 1 and in accordance with an embodiment. A data encryption service such as the data encryption service 114 described in connection with FIG. 1 may perform the second part 1600 of the example process described in connection with FIG. 16. Continuing 1602 from the first part 1500 of the example process illustrated in FIG. 15, the data encryption service may next use 1604 the result of the encryption for this iteration to generate an index key. The data encryption service may next encrypt 1606 the index for this iteration using the index key and may store 1608 the encrypted index in index storage.

Next, the data encryption service may discard 1610 the source data for this iteration (e.g., the data to encrypt for iteration zero and the result of the previous encryption for subsequent iterations). The data encryption service may also discard 1612 the index key for this iteration and may finally set 1614 the ciphertext for this iteration as the source data for the next iteration. The data encryption service may next determine 1616 if there are additional iterations in the encryption. If the data encryption service does determine 1616 that there are more iterations, the data encryption service may return 1622 to begin 1508 the next iteration. If the data encryption service does not determine 1616 that there are more iterations, the data encryption service may store 1618 the ciphertext for the last iteration in data storage as the final encrypted result and may discard 1620 any remaining intermediate data as described above.

Figure 17:
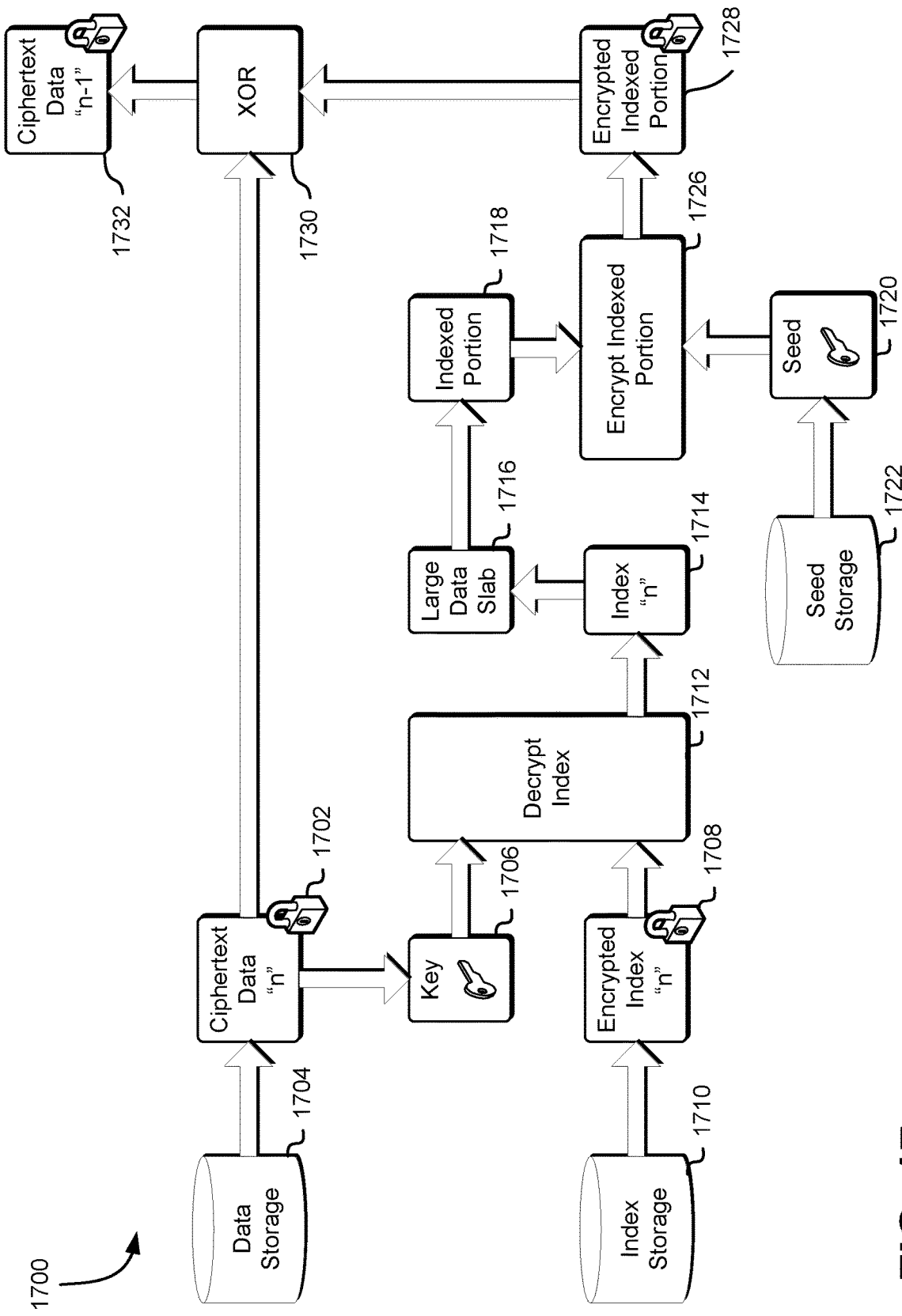
FIG. 17 illustrates an example environment where data that is encrypted with a multiple iteration data encryption algorithm using a large data slab is decrypted using a data encryption service.

FIG. 17 illustrates an example environment 1700 where data that is encrypted with a multiple iteration data encryption algorithm using a large data slab is decrypted using a data encryption service as described in FIG. 1 and in accordance with an embodiment. The example illustrated in FIG. 17 illustrates the first iteration of the decryption of the result of a layered encryption using a large data slab. In the example illustrated in FIG. 17, ciphertext data "n" 1702 is retrieved from data storage 1704. The ciphertext data "n" 1702 is the encrypted data that results from the layered encryption operation described above and is the input to the decryption operation described herein. The ciphertext data "n" 1702 is used to derive a key 1706, which may be derived by a cryptographic key service as described above. The key 1706 may then be used to decrypt 1712 an encrypted index 1708 for this iteration (e.g., iteration "n"). The encrypted index 1708 may be obtained from index storage 1710.

The index 1714 (e.g., index "n") may then be used to obtain an indexed portion 1718 (i.e., the block) from the large data slab. The indexed portion 1718 may then be encrypted 1726 using the seed obtained from seed storage 1722 to produce an encrypted indexed portion 1728 of the large data slab. Because the encrypted data "n" was generated by XORing the encrypted data "n−1" with the encrypted indexed portion 1728 for this iteration (i.e., the block indexed by the index, which was encrypted with the seed and the iteration number), the encrypted data "n−1" 1732 can be generated by XORing 1730 the ciphertext data "n" 1702 with the encrypted indexed portion 1728 of the large data slab. That is, if A⊕B=C (where A is the ciphertext data "n−1" 1732, B is the encrypted indexed portion 1728 of the large data slab for this iteration, and C is the ciphertext data "n" 1702), then C⊕B=A (i.e., the ciphertext data "n−1" 1732 is generated by XORing 1730 the ciphertext data "n" 1702 with the encrypted index portion 1728 of the large data slab).

It should be noted that the example illustrated in FIG. 17 illustrates the first iteration of "n" iterations of the layered decryption operation. By repeating the operations described in FIG. 17 a number of times (e.g., "n" times), the result (e.g., ciphertext data "n−1") will be the original plaintext data. For example, if the ciphertext data "n" was produced by performing twenty iterations of the layered encryption described above, starting with a plaintext data such as plaintext data 1218 described in connection with FIG. 12, then after twenty iterations of the operations described in FIG. 17, the same plaintext data (e.g., plaintext data 1218)

will be the result. As may be contemplated, the number of iterations for a layered encryption operation and/or the number of iterations for a layered decryption operation described herein are merely illustrative examples and other numbers of iterations for a layered encryption operation and other numbers of iterations for a layered decryption operation may be considered as within the scope of the present disclosure.

Figure 18:
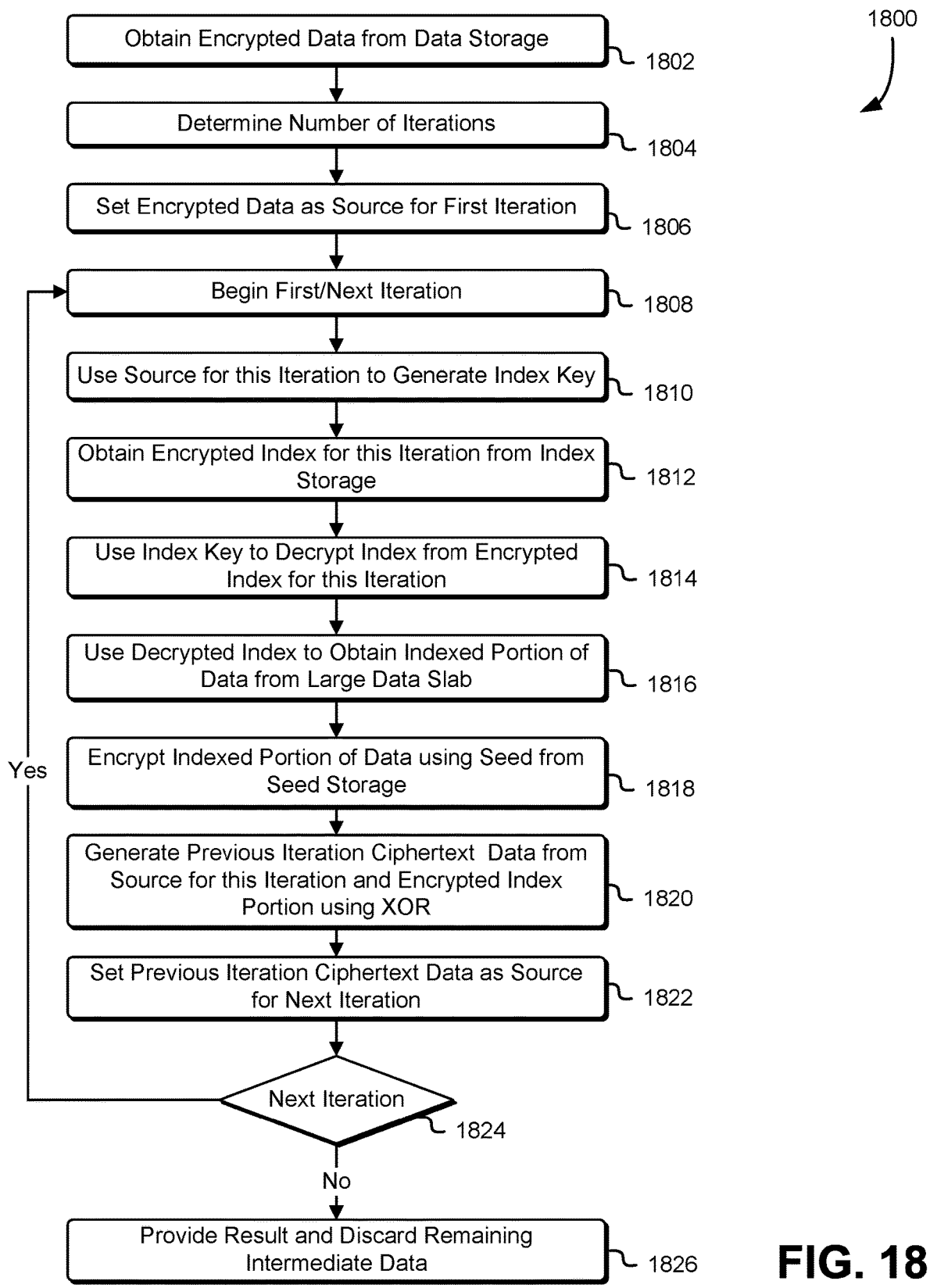
FIG. 18 illustrates an example process for decrypting data encrypted with a multiple iteration data encryption using a large data slab using a data encryption service.

FIG. 18 illustrates an example process 1800 for decrypting data encrypted with a multiple iteration data encryption using a large data slab using a data encryption service as described in FIG. 1 and in accordance with an embodiment. A data encryption service such as the data encryption service 114 described in connection with FIG. 1 may perform the example process 1800 described in connection with FIG. 18. The data encryption service may first obtain 1802 the encrypted data from data storage. The data encryption service may next determine 1804 the number of iterations for the decryption, which is the same as the number of iterations for the encryption. The data encryption service may then set 1806 the encrypted data as the source for the first iteration and may begin 1808 the first iteration.

For each iteration, the data encryption service may use the source for the iteration to generate 1810 an index key for the iteration. The data encryption service may next obtain 1812 the encrypted index for the current iteration and may use 1814 the index key to decrypt the encrypted index. The data encryption service may next use 1816 that decrypted index to obtain an indexed portion of data (e.g., a data block) from the large data slab. After the indexed portion of the data is obtained from the large data slab, the data encryption service may next encrypt 1818 that indexed portion of data from the large data slab using the seed to produce an encrypted indexed portion of the data from the large data slab, as described above.

The data encryption service may next generate 1820 the ciphertext data for the previous iteration (e.g., the result of the previous encryption iteration) by XORing the encrypted indexed portion of the data from the large data slab with the source data (also referred to herein as a "data source") for this iteration (e.g., the data to decrypt in the first iteration and the resulting encrypted data for subsequent iterations). The data encryption service may next set the ciphertext data for the previous iteration (i.e., the data generated by XORing the encrypted indexed portion of the data from the large data slab with the source data for this iteration) as the source data for the next iteration. The data encryption service may next determine 1824 whether to perform a next iteration. If the data encryption service does determine 1824 to perform a next iteration, the data encryption service may begin 1808 the next iteration. If the data encryption service does not determine 1824 to perform a next iteration, the data encryption service may provide 1826 the result of the last iteration as the decrypted data and may discard any remaining intermediate data.

Figure 19:
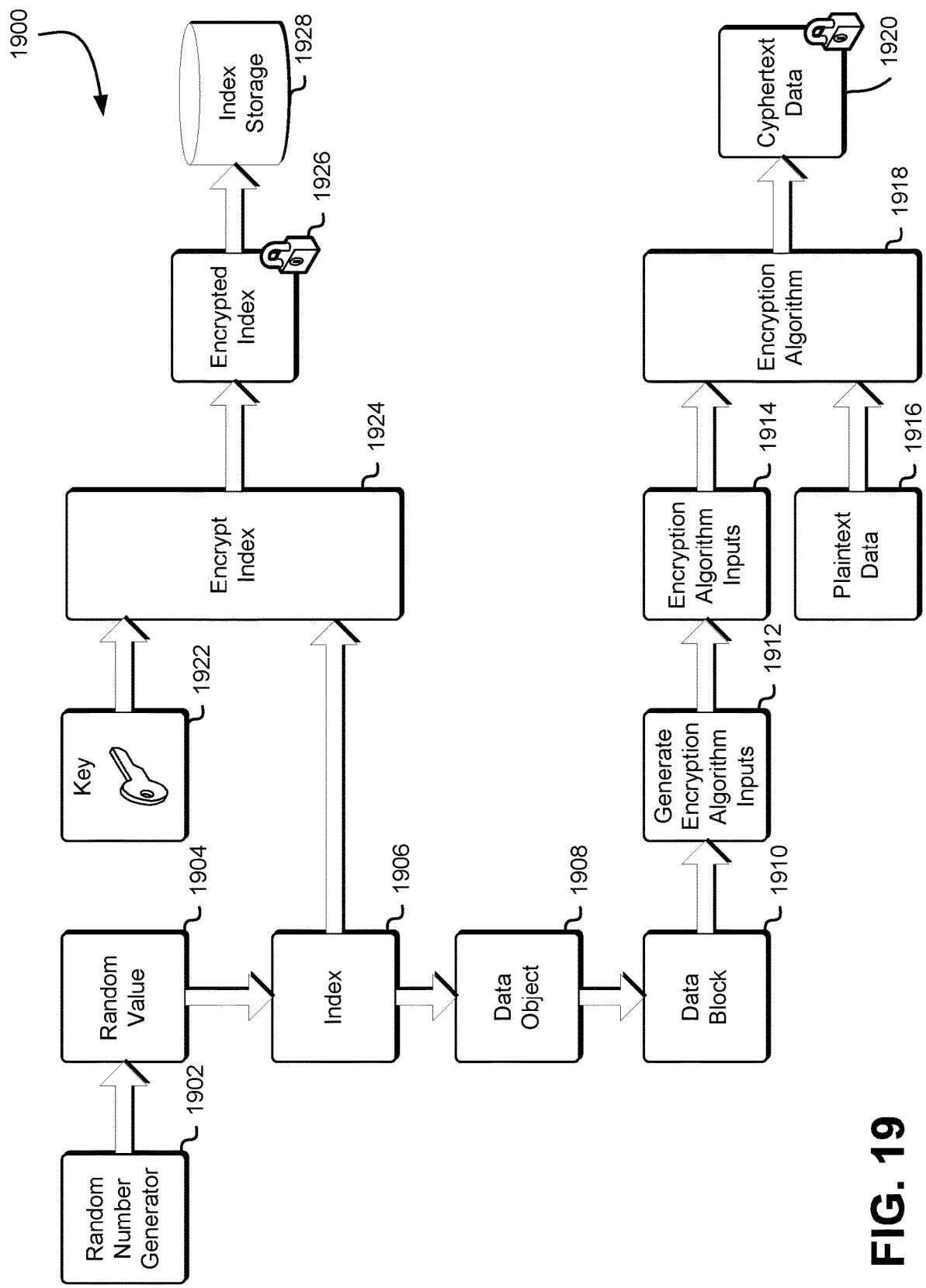
FIG. 19 illustrates an example environment where data is encrypted with a randomly selected data block using a data encryption service.

FIG. 19 illustrates an example environment 1900 where data is encrypted with a randomly selected data block using a data encryption service as described in connection with FIG. 1 and in accordance with an embodiment. In the example illustrated in FIG. 19, a random number generator 1902 (e.g., a pseudo-random number generator) is used to generate a random value 1904. The random value 1904 is used to generate an index 1906 that associates index values with respective blocks of a data object 1908. The data object 1908 may be a large data slab as described above or may be some other collection of data. In an embodiment, the data object includes random data such that each block of the data object is unique (i.e., no two blocks are identical) as described above. In an embodiment, the index 1906 that associates index values with respective blocks of a data object 1908 is not generated based on the random value 1904. In such an embodiment, the index 1906 may be generated according to data and/or metadata associated with the plaintext data 1916 as described above. In such an embodiment, the index 1906 may also be generated and/or specified by a customer associated with the plaintext data 1916.

In an embodiment, the random value is generated such that the random value is in a range of the number of different data blocks in the data object 1908 and that range of indexes is how the random value 1904 is used to generate an index 1906 that associates index values with respective blocks of a data object 1908. The data object may contain, for example, one-thousand blocks of data. In this example, the random value may be an integer between one and one-thousand inclusive (i.e., may be greater than or equal to one and less than or equal to one-thousand). In this example, the random value may also be an integer between zero and nine-hundred and ninety-nine inclusive. In another embodiment, the random value may be a non-integer value between, for example, zero and one inclusive that is used to determine the index that associates index values with respective blocks of a data object by, for example, multiplying the value by one-thousand. In another embodiment, the random value may be used as an input to a lookup table algorithm that provides the index that associates index values with respective blocks of a data object.

In an embodiment including, but not limited to any of the previously described embodiments, the random value is used to generate a plurality of indexes that associate index values with respective blocks of a data object. For example, the random value may be used to generate a first index of a contiguous set of indexes that associate index values with respective blocks of a data object, or the random value may be used to generate a first index that associates index values with respective blocks of a data object and subsequent indexes may be based, at least in part, on that first index.

From the random value 1904 that is used to generate an index 1906 that associates index values with respective blocks of a data object 1908, one or more data blocks 1910 may be identified based at least in part on the association. The one or more data blocks 1910 of the data object 1908 may then be used to generate 1912 encryption algorithm inputs 1914 to an encryption algorithm 1918 that is used to encrypt plaintext data 1916 to produce ciphertext data 1920. Various examples of how the one or more data blocks 1910 of the data object 1908 may then be used to generate 1912 encryption algorithm inputs 1914 to an encryption algorithm 1918 are described in more detail below. One example, described herein is using the one or more one or more data blocks 1910 of the data object 1908 as an input into a bitwise operation or an invertible bitwise operation such as, for example, an XOR operation. Another example, also described herein, is using the one or more one or more data blocks 1910 of the data object 1908 as an input to a key generation algorithm by, for example, hashing the one or more data blocks 1910 of the data object 1908 to generate an encryption key.

The encryption algorithm 1918 (also described herein as a "cryptographic operation") may include any cryptographic operation that may be used to encrypt data including, but not limited to, bitwise operations, invertible bitwise operations (e.g., XOR), or key-based encryption operations such as those described herein. The cryptographic operation may be an encryption operation (e.g., an operation to produce ciphertext data from plaintext data) and may also be a decryption operation (e.g., an operation to reproduce the plaintext data from the ciphertext data). The cryptographic operation may also be a layered encryption operation that takes plaintext as a first iteration and performs an iterative encryption that uses the result of a previous iteration as the source for a subsequent operation until the final ciphertext data is produced. The cryptographic operation may also be a layered decryption operation that takes ciphertext as a first iteration and performs an iterative decryption that uses the result of a previous iteration as the source for a subsequent operation. As may be contemplated, the types of cryptographic operations described herein are merely illustrative examples and other types of cryptographic operations may be considered as within the scope of the present disclosure.

In an embodiment, the data object 1908 includes a sequence of bits, which may be a sequence of random bits generated by, for example, a random number generator (e.g., a pseudo-random number generator). In an embodiment, the one or more data blocks 1910 each include one or more subsequences of the sequence of bits of the data object 1908. Each of the one or more data blocks 1910 may include a contiguous subsequence of the sequence of bits of the data object 1908. For example, if the data object 1908 is "0100 1001 0101 1110" then a four-bit data block may be, for example, "0100" (i.e., the first four bits) but may also be "0010" (i.e., the third through sixth bits). Each of the contiguous subsequences of the sequence of bits of the data object 1908 (i.e., each of the one or more data blocks 1910) may be contiguous with one another (i.e., each of the contiguous subsequences of the sequence of bits of the data object 1908 may be obtained from a single contiguous subsequence of the sequence of bits of the data object 1908). In such an example, each of the contiguous subsequences of the sequence of bits of the data object 1908 (i.e., each of the one or more data blocks 1910) may also not be contiguous with one another (i.e., each of the contiguous subsequences of the sequence of bits of the data object 1908 may be obtained from a different contiguous subsequence of the sequence of bits of the data object 1908). Accordingly, each of the subsequences of the sequence of bits of the data object 1908 may comprise a contiguous sequence of bits but the subsequences themselves may not be contiguous.

In another embodiment, the one or more data blocks 1910 each include one or more subsets of the sequence of bits of the data object 1908 that are not subsequences. Using the example above, if the data object 1908 is "0100 1001 0101 1110" then a four-bit data block may be any of the four bits of the data object 1908 such as, for example, the second, the ninth, the third, and the eleventh bits. In such an embodiment, a mapping function may be used that maps subsets of the sequence of bits of the data object 1908 to input values (e.g., the index 1906 and/or the random value 1904) such that, for each unique input value, a unique subset of the sequence of bits of the data object 1908 can be determined. In another embodiment, a lookup table may be used to map subsets of the sequence of bits of the data object 1908 to the input values (e.g., the index 1906 and/or the random value 1904). The index 1906 and/or the random value 1904 may be used to select the $n^{th}$ block or the $n^{th}$ sequence of bits of the data object (e.g., if the index is ten, the tenth block or the tenth sequence of bits may be chosen). In an embodiment, the index 1906 and/or the random value 1904 is used modulo the number of blocks or the number of sequences of bits where the index 1906 and/or the random value 1904 exceeds the number of blocks or the number of sequences of bits of the data object.

In the example illustrated in FIG. 19, the index 1906 is encrypted 1924 using an encryption key 1922 and the encrypted index 1926 is stored in index storage 1928. In an embodiment, the random value 1904 that is used to generate an index 1906 that associates index values with respective blocks of a data object 1908 is encrypted 1924 using an encryption key 1922 and the encrypted random value is stored. In another embodiment, the index 1906 and/or the random value 1904 are not encrypted before being stored. In another embodiment, the index and/or the random value are not stored and are, instead, regenerated if needed later.

Figure 20:
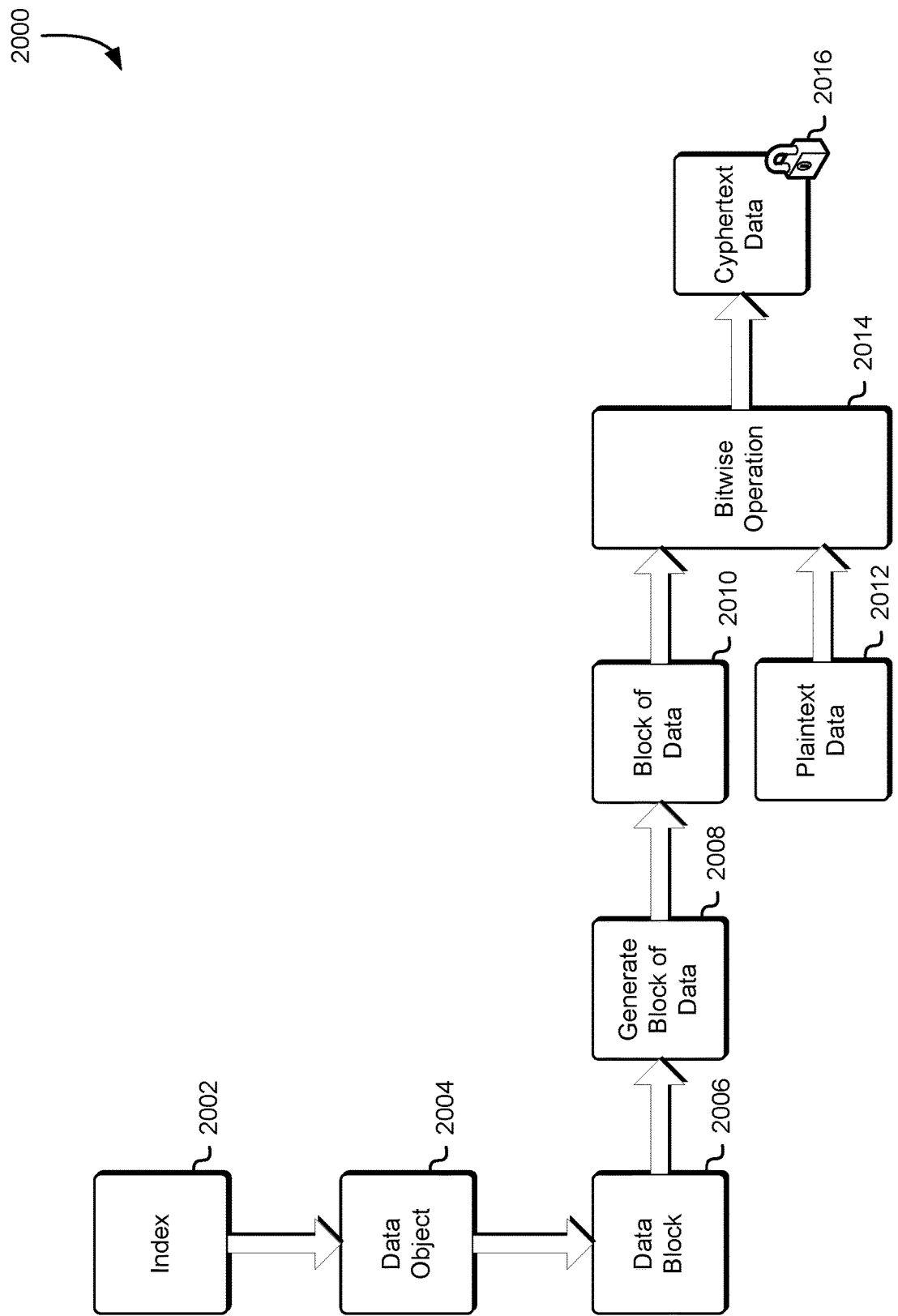
FIG. 20 illustrates an example environment where a block of data generated from a data object is used to encrypt data using a data encryption service.

FIG. 20 illustrates an example environment 2000 where a block of data generated from a data object is used to encrypt data using a data encryption service as described in connection with FIG. 1 and in accordance with an embodiment. In the example illustrated in FIG. 20, an index 2002 (such as the indexes described above) that associates index values with respective blocks of a data object 2004 is used to identify one or more data blocks 2006 based at least in part on the association. The one or more data blocks 2006 of the data object 2004 may then be used to generate 2008 a block of data 2010 (e.g., the encryption algorithm inputs) to a bitwise operation 2014 (e.g., the encryption algorithm) that is used to produce ciphertext data 2016 from the plaintext data 2012. In an embodiment, the bitwise operation 2014 is an XOR operation, which is an invertible bitwise operation as described herein. In an embodiment, the data object 2004, the data block 2006, and/or the block of data 2010 include random data (e.g., data that is randomly generated) as described above.

In the examples described herein, a bitwise operation is an operation that operates on each binary digit ("bit") of the data. Examples of such bitwise operations that operate on each bit of the data include, but are not limited to, a "NOT" operation, a "LEFT SHIFT" operation, or a "RIGHT SHIFT" operation. For example, a "NOT" operation may change every zero bit to a one bit and change every one bit to a zero bit. In some examples, a bitwise operation may take a pair of data inputs and combine each corresponding bit to produce a result. Examples of such bitwise operations that take a pair of data inputs and combine each corresponding bit to produce a result include, but are not limited to, an "OR" operation, an "AND" operation, an "XOR" operation, and a "NAND" operation. Some of these operations are invertible bitwise operations are invertible operations (e.g., operations where, given an input A and a result B, the input A can be determined from the result B or, given inputs A and B and a result C, the input A can be determined from the result C and the input A and/or the input B can be determined from the result C and the input A). An example of an invertible bitwise operation that operates on each bit of the data is the "NOT" operation. An example of an invertible bitwise operation that takes a pair of data inputs and combines each corresponding bit to produce a result is the "XOR" operation (described above).

The bitwise operation 2014 has, as inputs, the plaintext data 2012 and the block of data 2010. In an embodiment, the block of data 2010 will have a size that is the same as the size of the plaintext data 2012. In another embodiment, the block of data 2010 will have a size that is larger than the size of the plaintext data 2012. In such an embodiment, a subset of the block of data 2010 may be used in the bitwise operation 2014 to generate the ciphertext data 2016. In another embodiment, the block of data 2010 will have a size that is smaller than the size of the plaintext data 2012. In such an embodiment, the block of data 2010 may be used more than once in the bitwise operation 2014 to generate the ciphertext data 2016. For example, if the block of data 2010 is one quarter the size of the plaintext data 2012, the block of data 2010 may be used four times in the bitwise operation 2014 to generate the ciphertext data 2016. In such an example, the block of data 2010 may be permuted or otherwise altered prior to each use.

Figure 21:
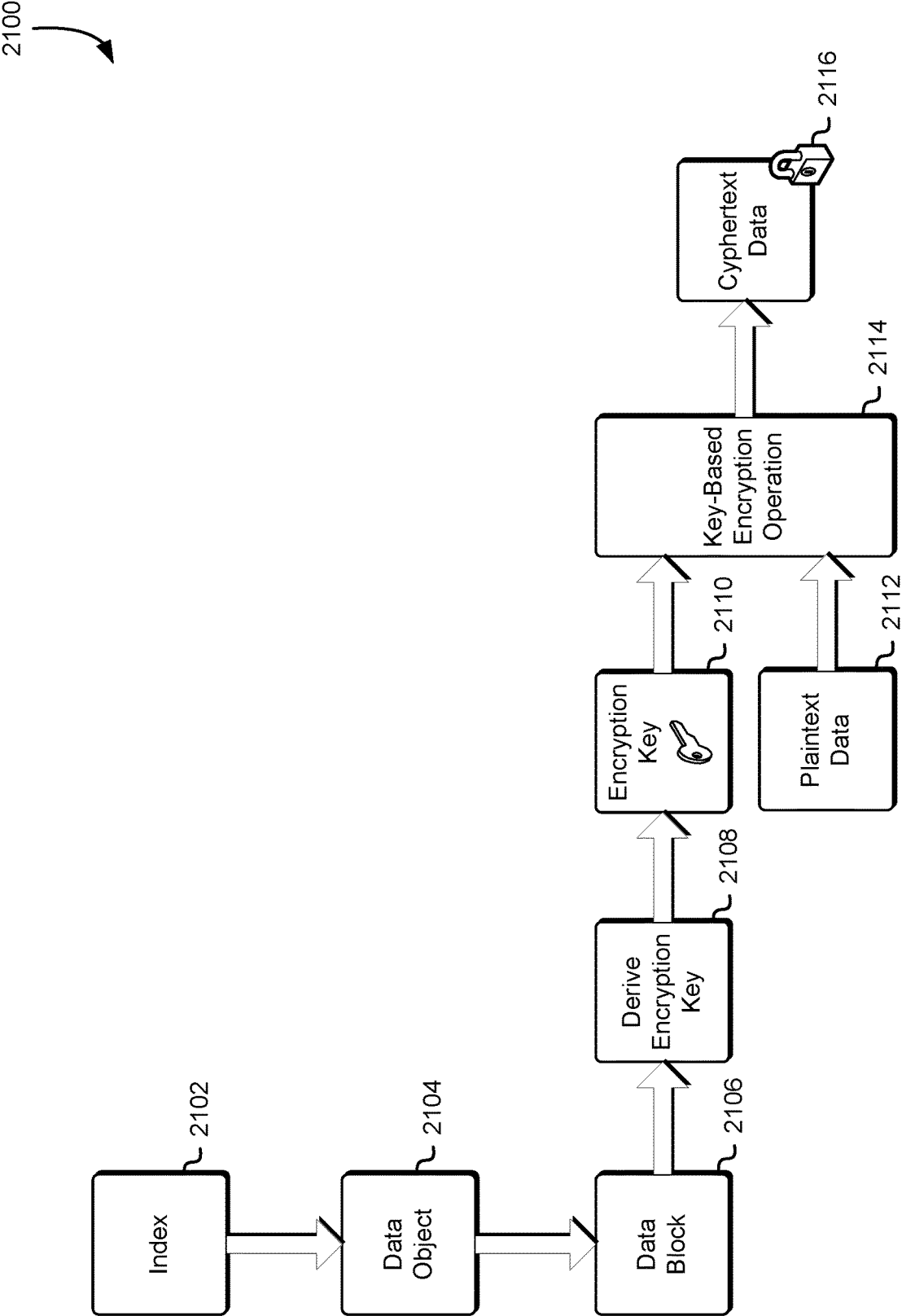
FIG. 21 illustrates an example environment where a cryptographic key generated from a data object is used to encrypt data using a data encryption service.

FIG. 21 illustrates an example environment 2100 where a cryptographic key generated from a data object is used to encrypt data using a data encryption service as described in connection with FIG. 1 and in accordance with an embodiment. In the example illustrated in FIG. 21, an index 2102 (such as the indexes described above) that associates index values with respective blocks of a data object 2104 is used to identify one or more data blocks 2106 based at least in part on the association. The one or more data blocks 2106 of the data object 2104 may then be used to derive 2108 an encryption key 2110 (e.g., the encryption algorithm inputs) to a key-based encryption operation 2114 (e.g., the encryption algorithm) that is used to produce ciphertext data 2116 from the plaintext data 2112.

The operation to derive 2108 the encryption key 2110 may be a hashing operation that produces a hash of the one or more data blocks 2106 of the data object 2104 and uses the result of that hashing operation to derive 2108 the encryption key 2110. The one or more data blocks 2106 of the data object 2104 may be used to derive 2108 the encryption key 2110 using, for example, a cryptographic key service as described above. The encryption key 2110 may then be used to encrypt the plaintext data 2112. In an embodiment, the encryption key 2110 is not stored after it is used to encrypt the plaintext data 2112. In such an embodiment, the encryption key 2110 may regenerated from the one or more data blocks 2106 that are selected based at least in part on the index 2102.

Figure 22:
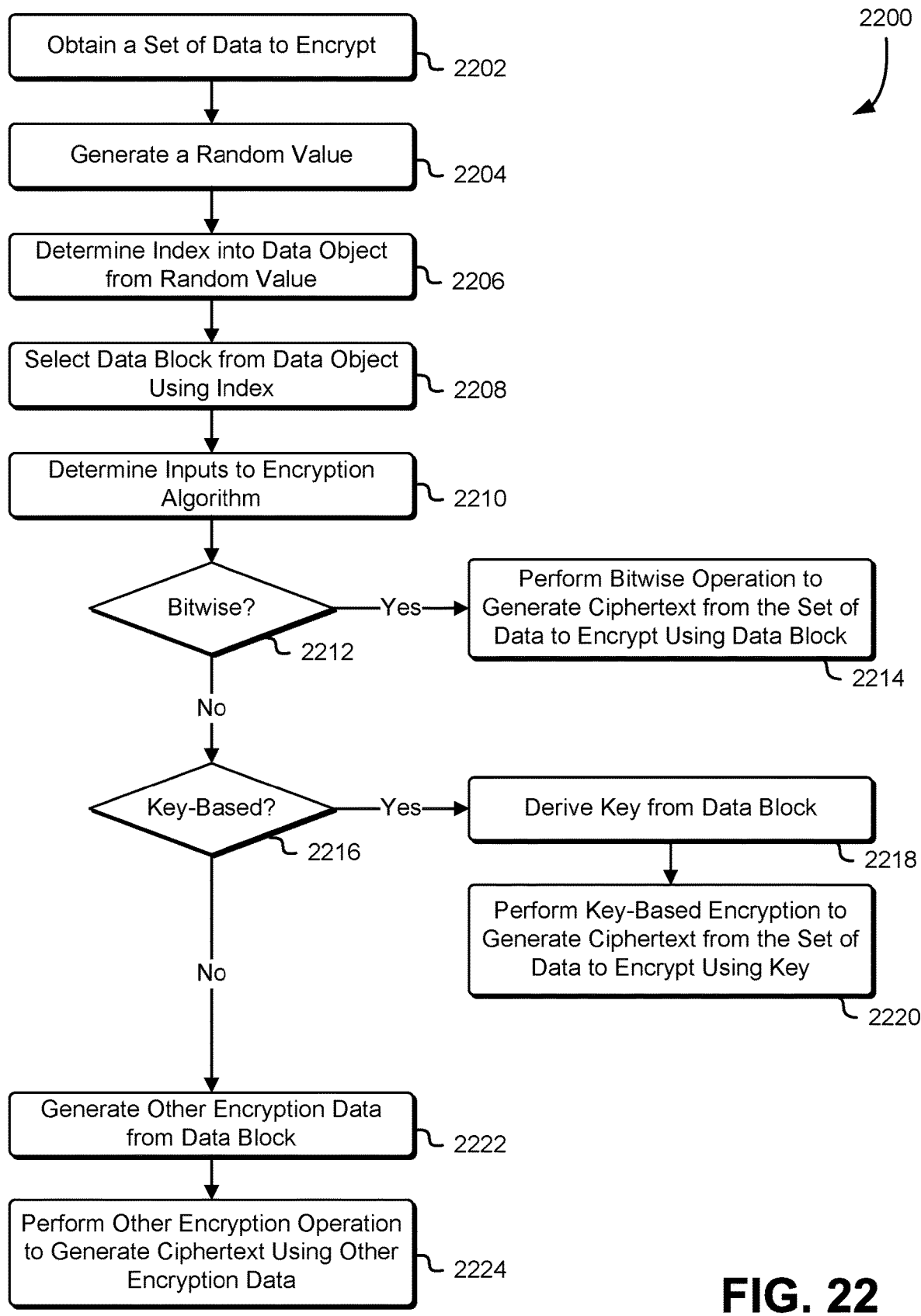
FIG. 22 illustrates an example process for encrypting data using with a randomly selected data block using a data encryption service.

FIG. 22 illustrates an example process 2200 for encrypting data using with a randomly selected data block using a data encryption service as described in connection with FIG. 1 and in accordance with an embodiment. A data encryption service such as the data encryption service 114 described in connection with FIG. 1 may perform the example process 2200 described in connection with FIG. 22. The data encryption service may first obtain 2202 a set of data to encrypt. The data encryption service may then generate 2004 a random value and determine 2206 an index that associates index values with respective blocks of a data object as described above. Based at least in part on the index that associates index values with respective blocks of a data object, the data encryption service may then select 2208 one or more data blocks from the data object.

The data encryption service may then determine 2210 the inputs to the encryption algorithm based at least in part on the type of encryption algorithm. The data encryption service may first determine 2212 if the encryption algorithm uses a bitwise operation such as, for example, an XOR operation. If the data encryption service does determine 2212 that the encryption algorithm is a bitwise operation, the data encryption service may perform 2214 the bitwise operation to generate the ciphertext from the set of data to encrypt using the data block as described above.

If the data encryption service does not determine 2212 that the encryption algorithm uses a bitwise operation, the data encryption service may next determine 2216 if the encryption algorithm is a key-based algorithm such as, for example, an encryption based on a cryptographic key such as, for example, an electronic codebook ("ECB") mode encryption or other such block cipher mode of encryption as described above. If the data encryption service does determine 2216 that the encryption algorithm is a key-based algorithm, the data encryption service may derive 2218 the key from the data block and may use the key to perform 2220 the key based encryption to generate the ciphertext from the set of data to encrypt using the key as described above.

If the data encryption service does not determine 2216 that the encryption algorithm is a key-based algorithm, the data encryption service may generate other encryption data from the data block and may perform 2224 another encryption operation to generate the ciphertext using the other encryption data.

Figure 23:
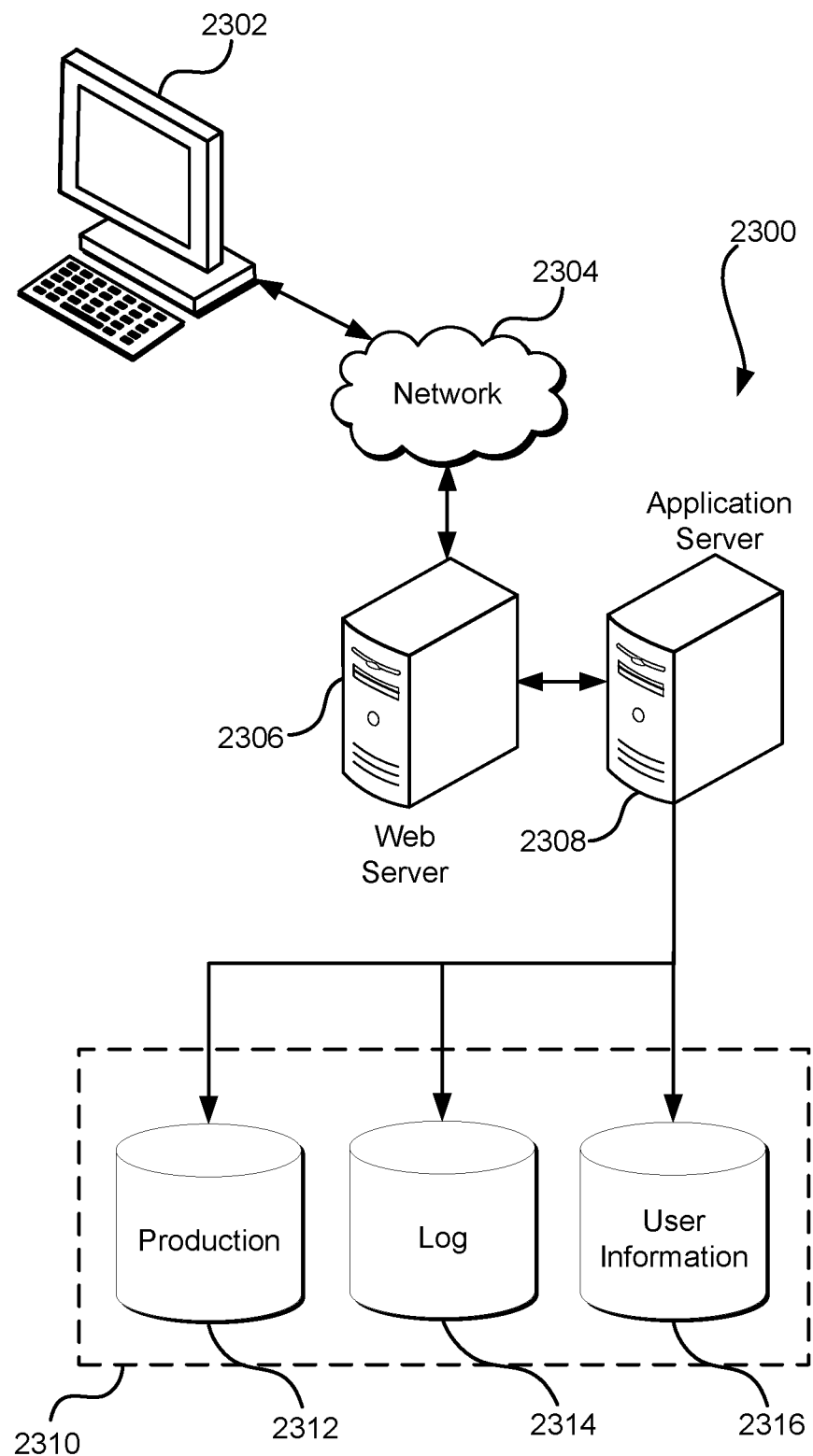
FIG. 23 illustrates an environment in which various embodiments can be implemented.

FIG. 23 illustrates aspects of an example environment 2300 for implementing aspects in accordance with various embodiments. As will be appreciated, although a web-based environment is used for purposes of explanation, different environments may be used, as appropriate, to implement various embodiments. The environment includes an electronic client device 2302, which can include any appropriate device operable to send and/or receive requests, messages, or information over an appropriate network 2304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 2306 for receiving requests and serving content in response thereto, although for other networks an alternative device serving a similar purpose could be used as would be apparent to one of ordinary skill in the art.

The illustrative environment includes at least one application server 2308 and a data store 2310. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 2302 and the application server 2308, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2310 can include several separate data tables, databases, data documents, dynamic data storage schemes and/or other data storage mechanisms and media for storing data relating to a particular aspect of the present disclosure. For example, the data store illustrated may include mechanisms for storing production data 2312 and user information 2316, which can be used to serve content for the production side. The data store also is shown to include a mechanism for storing log data 2314, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 2310. The data store 2310 is operable, through logic associated therewith, to receive instructions from the application server 2308 and obtain, update, or otherwise process data in response thereto. The application server 2308 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 23. Thus, the depiction of the system 2300 in FIG. 23 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Additionally, a "proper subset" of a corresponding set is a subset that is not equal to the corresponding set, but is a subset that does not include all of the members of the corresponding set.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising at least one computing device configured with processors and memory, the memory including instructions that, upon execution, cause the system to:
   designate a first set of data as a data source; and
   for an iteration of an iterative encryption process that comprises multiple iterations that each use a different source of data:
      generate a second set of data from a data object such that a data size of the second set of data is based at least in part on a data size of the first set of data, the second set of data being generated using a seed to cryptographically alter data in the data object, wherein the seed is randomly generated;
      encrypt the data source by cryptographically combining the second set of data with the data source to produce an encrypted set of data to be stored in association with the seed; and
      designate the encrypted set of data as the data source for a later iteration of the iterative encryption process.

2. The system of claim 1, wherein the memory further includes instructions that, upon execution, cause the system to store the encrypted set of data for the iteration of the iterative encryption process in persistent storage.

3. The system of claim 1, wherein the memory further includes instructions that, upon execution, cause the system to:
   designate an encrypted set of data for an iteration of the iterative encryption process as a second data source; and
   for an iteration of an iterative decryption process:
      generate a third set of data from the data object such that a data size of the third set of data is based at least in part on the data size of the first set of data;
      decrypt the second data source by cryptographically combining the third set of data with the second data source to produce a decrypted set of data; and
      designate the decrypted set of data as the data source for a later iteration of the iterative decryption process.

4. The system of claim 1, wherein the seed is generated based at least in part on metadata associated with the first set of data.

5. The system of claim 1, wherein:
   the data object is used to generate the second set of data a number of times; and
   after the data object is used to generate the second set of data the number of times, the data object is encrypted and stored in persistent storage.

6. The system of claim 1, wherein the encrypted set of data is one of a plurality of sets of data that are stored.

7. A method, comprising:

designating a first set of data as a data source; and for an iteration of an iterative encryption process that comprises multiple iterations that each use a different source of data:
- generating a second set of data from a data object such that a data size of the second set of data is based at least in part on a data size of the first set of data, the second set of data being generated using a seed to cryptographically alter data in the data object, wherein the seed is randomly generated;
- encrypting the data source by cryptographically combining the second set of data with the data source to produce an encrypted set of data to be stored in association with the seed; and
- designating the encrypted set of data as the data source for a later iteration of the iterative encryption process.

8. The method of claim 7, further comprising storing the encrypted set of data for the iteration of the iterative encryption process in persistent storage.

9. The method of claim 7, further comprising:
designating an encrypted set of data for an iteration of the iterative encryption process as a second data source; and
for an iteration of an iterative decryption process:
- generating a third set of data from the data object such that a data size of the third set of data is based at least in part on the data size of the first set of data;
- decrypting the second data source by cryptographically combining the third set of data with the second data source to produce a decrypted set of data; and
- designating the decrypted set of data as the data source for a later iteration of the iterative decryption process.

10. The method of claim 7, wherein the seed is generated based at least in part on metadata associated with the first set of data.

11. The method of claim 7, wherein:
the data object is used to generate the second set of data a number of times; and
after the data object is used to generate the second set of data the number of times, the data object is encrypted and stored in persistent storage.

12. The method of claim 7, wherein the encrypted set of data is one of a plurality of sets of data that are stored.

13. A non-transitory computer-readable storage medium having stored thereon instructions that, if executed by one or more processors of a computer system, cause the computer system to:
designate a first set of data as a data source; and
for an iteration of an iterative encryption process that comprises multiple iterations that each use a different source of data:
- generate a second set of data from a data object such that a data size of the second set of data is based at least in part on a data size of the first set of data, the second set of data being generated using a seed to cryptographically alter data in the data object, wherein the seed is randomly generated;
- encrypt the data source by cryptographically combining the second set of data with the data source to produce an encrypted set of data to be stored in association with the seed; and
- designate the encrypted set of data as the data source for a later iteration of the iterative encryption process.

14. The non-transitory computer-readable storage medium of claim 13, further comprising instructions that, upon execution, cause the computer system to store the encrypted set of data for the iteration of the iterative encryption process in persistent storage.

15. The non-transitory computer-readable storage medium of claim 13, further comprising instructions that, upon execution, cause the computer system to:
designate an encrypted set of data for an iteration of the iterative encryption process as a second data source; and
for an iteration of an iterative decryption process:
- generate a third set of data from the data object such that a data size of the third set of data is based at least in part on the data size of the first set of data;
- decrypt the second data source by cryptographically combining the third set of data with the second data source to produce a decrypted set of data; and
- designate the decrypted set of data as the data source for a later iteration of the iterative decryption process.

16. The non-transitory computer-readable storage medium of claim 13, wherein the seed is generated based at least in part on metadata associated with the first set of data.

17. The non-transitory computer-readable storage medium of claim 13, wherein:
the data object is used to generate the second set of data a number of times; and
after the data object is used to generate the second set of data the number of times, the data object is encrypted and stored in persistent storage.

18. The non-transitory computer-readable storage medium of claim 13, wherein the encrypted set of data is one of a plurality of sets of data that are stored.

* * * * *